(12) United States Patent
Kwon et al.

(10) Patent No.: US 9,609,225 B2
(45) Date of Patent: Mar. 28, 2017

(54) DEFORMABLE DISPLAY DEVICE AND OPERATING METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/855,000

(22) Filed: Sep. 15, 2015

(65) Prior Publication Data

US 2016/0373654 A1 Dec. 22, 2016

(30) Foreign Application Priority Data

Jun. 22, 2015 (KR) .................. 10-2015-0088685

(51) Int. Cl.
| | |
|---|---|
| H04N 7/14 | (2006.01) |
| H04N 5/232 | (2006.01) |
| H04N 5/225 | (2006.01) |
| H04N 5/222 | (2006.01) |
| G06F 1/16 | (2006.01) |
| G06F 3/0482 | (2013.01) |
| G06F 3/0484 | (2013.01) |
| G09G 5/38 | (2006.01) |
| G09G 5/373 | (2006.01) |

(52) U.S. Cl.
CPC ....... *H04N 5/23293* (2013.01); *G06F 1/1652* (2013.01); *G06F 1/1677* (2013.01); *G06F 3/0482* (2013.01); *G06F 3/04842* (2013.01); *G09G 5/373* (2013.01); *G09G 5/38* (2013.01)

(58) Field of Classification Search
USPC ... 348/14.07, 207.2, 207.99, 333.01, 333.02, 348/333.05, 333.06, 376; D16/211, 206, D16/212, 241
See application file for complete search history.

(56) References Cited

U.S. PATENT DOCUMENTS

| | | | | |
|---|---|---|---|---|
| 7,184,086 | B2 * | 2/2007 | Tamura | H04N 5/2251 348/333.06 |
| 7,320,600 | B2 * | 1/2008 | Fyke | H04M 1/0216 439/31 |
| 7,463,238 | B2 * | 12/2008 | Funkhouser | G06F 1/1601 345/107 |
| 2005/0285963 | A1 * | 12/2005 | Misawa | H04N 5/23293 348/333.06 |
| 2006/0007368 | A1 | 1/2006 | Slikkerveer et al. | |
| 2006/0039031 | A1 * | 2/2006 | Funato | H04N 1/00127 358/1.15 |

(Continued)

FOREIGN PATENT DOCUMENTS

| | | |
|---|---|---|
| EP | 2 648 066 A2 | 10/2013 |
| WO | WO 2013/048868 A2 | 4/2013 |

*Primary Examiner* — Aung S Moe
*Assistant Examiner* — Euel Cowan
(74) *Attorney, Agent, or Firm* — KED & Associates LLP

(57) ABSTRACT

Provided is an operating method of a flexible display device including a display. The method includes: displaying, at a preview area of the display, a preview image corresponding to an object; expanding the display in an first direction according to detecting the display is expanded in the first direction; and capturing an image of the object when the display is expanded in the first direction.

16 Claims, 25 Drawing Sheets

(56) References Cited

U.S. PATENT DOCUMENTS

| | | | |
|---|---|---|---|
| 2010/0117975 A1* | 5/2010 | Cho | G06F 1/1626 345/173 |
| 2013/0093660 A1* | 4/2013 | Hirsch | G06F 1/1694 345/156 |
| 2014/0002430 A1 | 1/2014 | Kwack et al. | |
| 2014/0101560 A1* | 4/2014 | Kwak | G06F 1/1652 715/738 |
| 2015/0091796 A1* | 4/2015 | Kwon | G06T 3/40 345/156 |
| 2015/0146079 A1* | 5/2015 | Kim | H04N 5/23293 348/345 |
| 2015/0227224 A1* | 8/2015 | Park | G06F 3/0487 345/173 |

\* cited by examiner

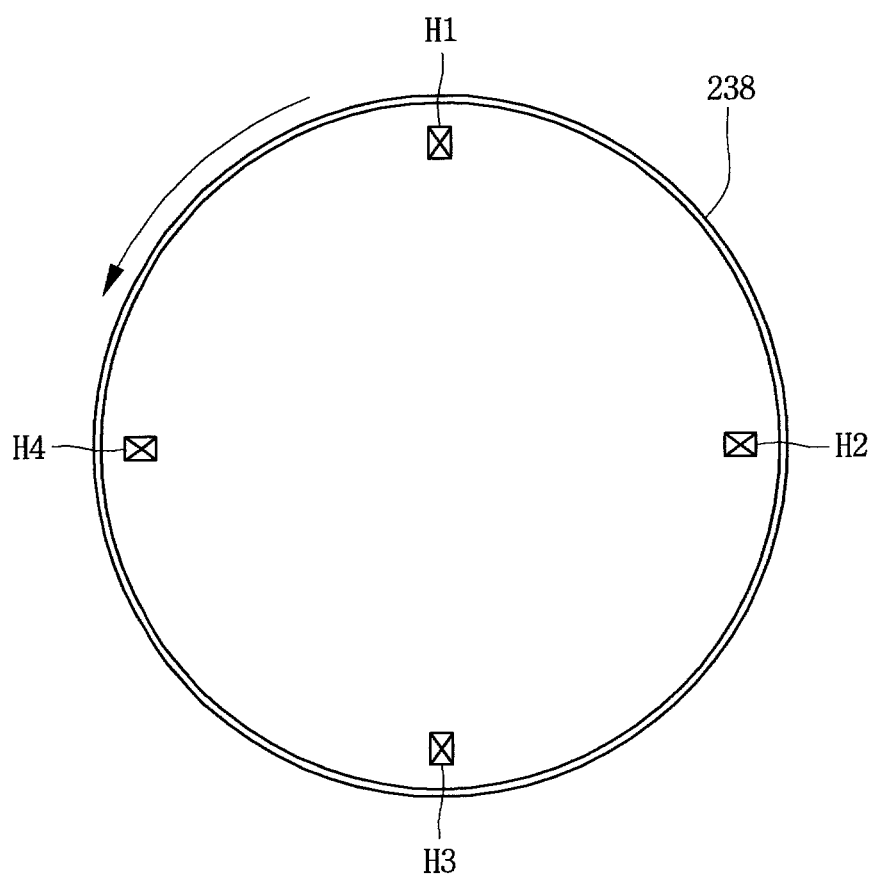

DEFORMABLE DISPLAY DEVICE AND OPERATING METHOD THEREOF

CROSS-REFERENCE TO RELATED APPLICATION

This application claims priority under 35 U.S.C. §119 to Korean Application No. 10-2015-0088685 filed on Jun. 22, 2015, whose entire disclosure is hereby incorporated by reference.

BACKGROUND

1. Field

The present disclosure relates to a flexible display device and an operating method thereof.

2. Background

With the recent development of display related technology, flexible display devices at the usage stage, for example, rolled in a roll form or flexible in at least one direction, are being studied and developed. Since these displays are flexible in various forms, they satisfy the demand on a large-sized display at the usage state and a small-sized display for carrying.

Moreover, flexible display devices may be deformed to a predetermined form and also may be deformed to various forms in correspondence to a user's request or the need of a situation where a display is used. Accordingly, when the display area of a display is fixed, there may be inconvenience in use.

For example, when a display area of a display is fixed during camera shooting, it is impossible to check a picture during shooting and it is inconvenient to enter an additional screen and check a result of continuous shooting.

BRIEF DESCRIPTION OF THE DRAWINGS

The embodiments will be described in detail with reference to the following drawings in which like reference numerals refer to like elements wherein:

FIGS. 3A to 3F are diagrams illustrating a configuration and operation of a rollable display device which is a type of a flexible display device according to an embodiment.

DETAILED DESCRIPTION

Figure 1A:
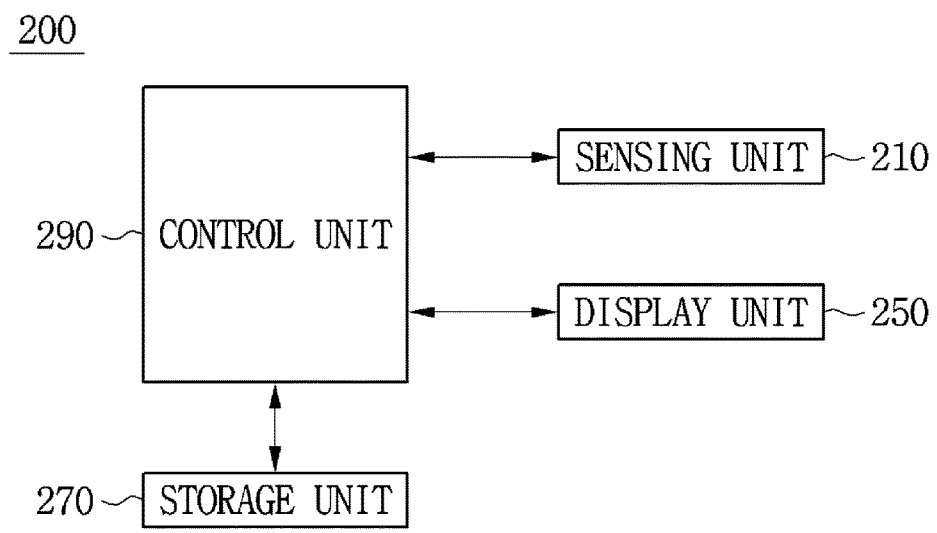
FIG. 1A is a view illustrating a configuration of a flexible display device according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Figure 1B:
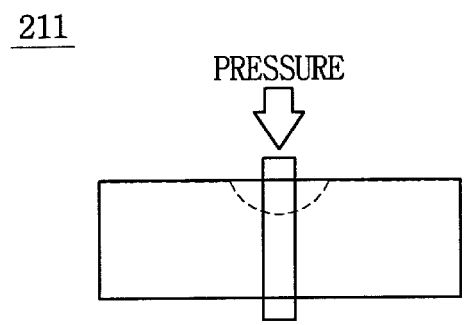
FIG. 1B is a view illustrating a pressure sensor configuring a sensing unit.
Figure 1C:
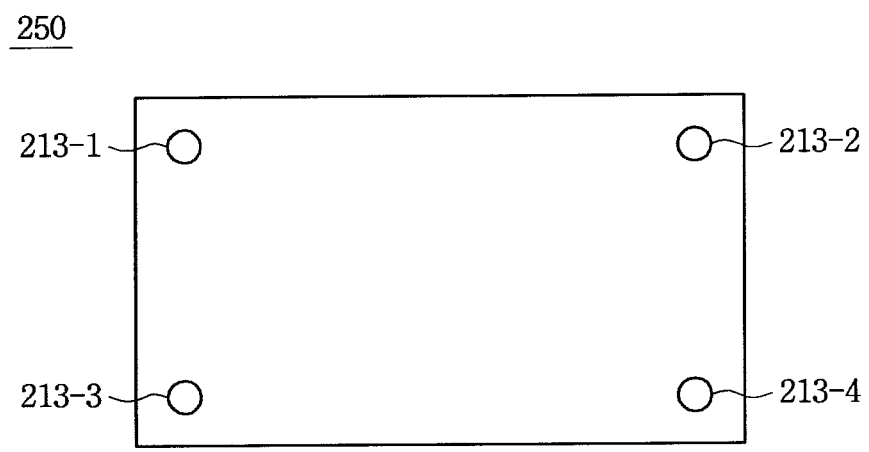
FIG. 1C is a view illustrating a configuration of a display unit where a sensing unit includes a plurality of acceleration sensors.

FIGS. 1A to 1C are views illustrating a configuration of a flexible display device according to an embodiment of the present invention.

Especially, FIG. 1A is a block diagram illustrating a configuration of a flexible display device 200 according to an embodiment of the present invention. FIG. 1B is a view illustrating a pressure sensor 211 configuring a sensing unit 210. FIG. 1C is a view illustrating a configuration of a display unit 250 where a plurality of acceleration sensors 231-1 to 213-4.

Unlike an existing display that is implemented only with rigid material such as glass or silicon, the flexible display device 200 according to an embodiment of the present invention is a next generation display device that is implemented in various and new environments due to its bending and stretchable characteristics.

According to an embodiment of the present invention, the flexible display device 200 may be a stretchable display device that is stretched when pulled and reduced to its original state again when released. The stretchable display device is stretched when pulled and fixed in a stretched state when a predetermined time elapses in the stretched state. Additionally, the stretchable display device may be reduced to its original state when reducing force is applied.

According to another embodiment of the present invention, the flexible display device 200 may be a rollable display device that is rolled in a roll form or changeable to be unrolled like paper.

Referring to FIG. 1A, the flexible display device 200 may include a sensing unit 210, a display unit 250, a storage unit 270, and a control unit 290.

The sensing unit 210 may detect that the display unit 250 is expanded or reduced.

The sensing unit 210 may detect that the intensity of force and the direction of force, which are applied to the display unit 250.

According to an embodiment of the present invention, the sensing unit 210 may include at least one pressure sensor. At least one pressure sensor may be disposed at the display unit 250. When the sensing unit 210 includes at least one pressure sensor, each pressure sensor 211, as shown in FIG. 1B, may detect changes in capacitance or resistance between both ends of an area where pressure (force) is applied. The pressure sensor 211 may deliver at least one of a capacitance change signal indicating the detected change in capacitance or a resistance change signal indicating the detected change in resistance to the control unit 290. The capacitance change signal or the resistance change signal may include information on at least one of the intensity and direction of a force applied to the pressure sensor 211. The control unit 290 may obtain at least one of the direction and intensity of a force applied to the display unit 250 by using a capacitance change signal or a resistance change signal, which is received from the pressure sensor 211.

According to another embodiment of the present invention, the sensing unit 210, as shown in FIG. 1C, may include a plurality of acceleration sensors 213-1 to 213-4. When the display unit 250 has a rectangular form, each acceleration sensor may be disposed adjacent to each vertex of a rectangle. When the display unit 250 includes a flexible substrate and an image display unit described later, the plurality of acceleration sensors 213-1 to 213-4 may be disposed at a lower end of the flexible substrate and the image display unit may be disposed at an upper end of the flexible substrate but this is just exemplary and they may be built in the flexible substrate or the image display unit.

The acceleration sensor is a sensor for detecting an acceleration when object moves or the intensity of impact. When the acceleration sensor is used, a movement state of the display unit 250 is detected in more detail. The acceleration sensor may sense an acceleration of the display unit 250 in a direction of each of three axes (for example, an x-axis, a y-axis, and a z-axis) vertical to each other. The control unit 290 may obtain a movement speed by using the accelerations of the 3-axes directions measured through the acceleration sensor. The control unit 290 may obtain a distance that the display unit 250 extends in the 3-axes directions by using the obtained movement speed. The control unit 290 may obtain the direction and intensity of force applied to the display unit 250 by using a movement speed and a movement distance obtained by using an acceleration sensor. The control unit 290 may expand the display unit 250 according to the obtained direction and intensity of force.

According to another embodiment of the present invention, the sensing unit 210 may include a plurality of hole sensors. The plurality of hole sensors may be disposed inside or on the display unit 250. When the sensing unit 210 includes a plurality of hole sensors, the control unit 290 may expand or reduce the display unit 250 through a voltage detected from a hole sensor according to a force applied to the display unit 250.

The display unit 250 may be stretched in at least one direction. The display unit 250 may include a flexible substrate and an image display unit. The flexible substrate may be configured with polydimethylsiloxane (PDMS) having excellent stretchability and may be expanded according to pulling force. An image display unit may be formed on the flexible substrate and may be expanded as the flexible substrate expands. The image display unit may display an image.

The display unit 250 may include an organic light emitting diode (OLED).

The storage unit 270 may match the intensity of a force applied to the display unit 250 and the expansion or reduction degree of the display unit 250 corresponding to the intensity of force and store them. The expansion degree of the display unit 250 may represent a length that the display unit 250 expands and the reduction degree of the display unit 250 may represent a length that the display unit 250 is reduced.

The control unit 290 may expand or reduce the display unit 250 according to a force detected through the sensing unit 210. The expansion of the display unit 250 may represent that the size of a screen displayed by the display unit 250 is enlarged and the reduction of the display unit 250 may represent that the size of a screen displayed by the display unit 250 is reduced. The control unit 290 may change a graphic or image displayed on a screen as the screen size of the display unit 250 is enlarged or reduced.

Besides that, the control module 290 may control overall operations of the flexible display device 200. More specific operations of the control unit 290 are described with reference to the drawings.

Figure 2A:
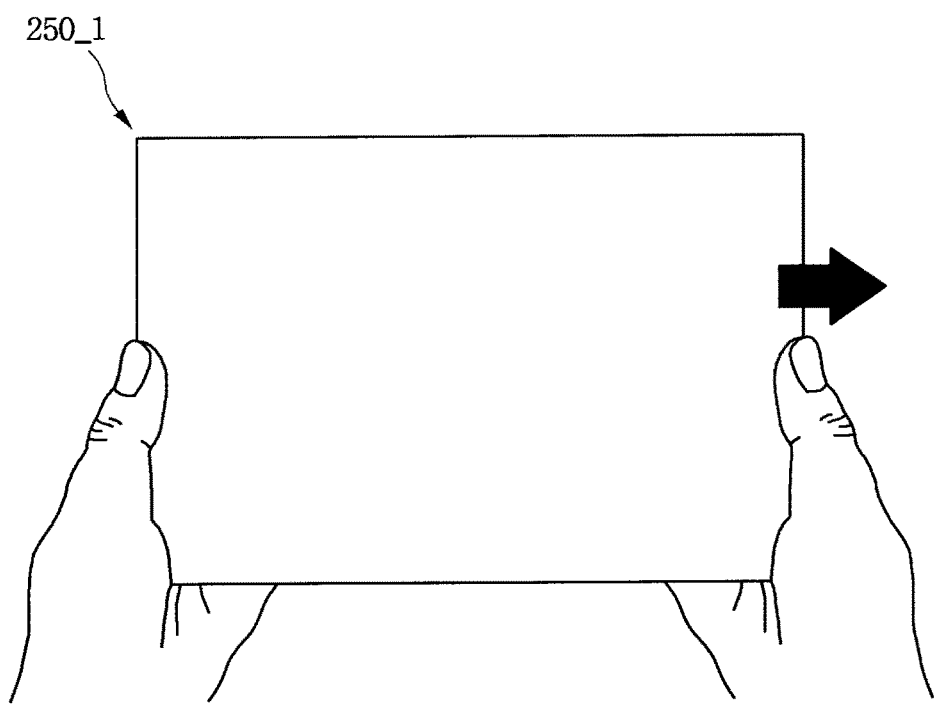
FIGS. 2A and 2B are views illustrating a usage example of a stretchable display device that is an example of a flexible display device.
Figure 2A:
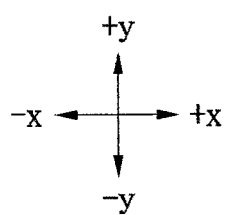
Figure 2B:
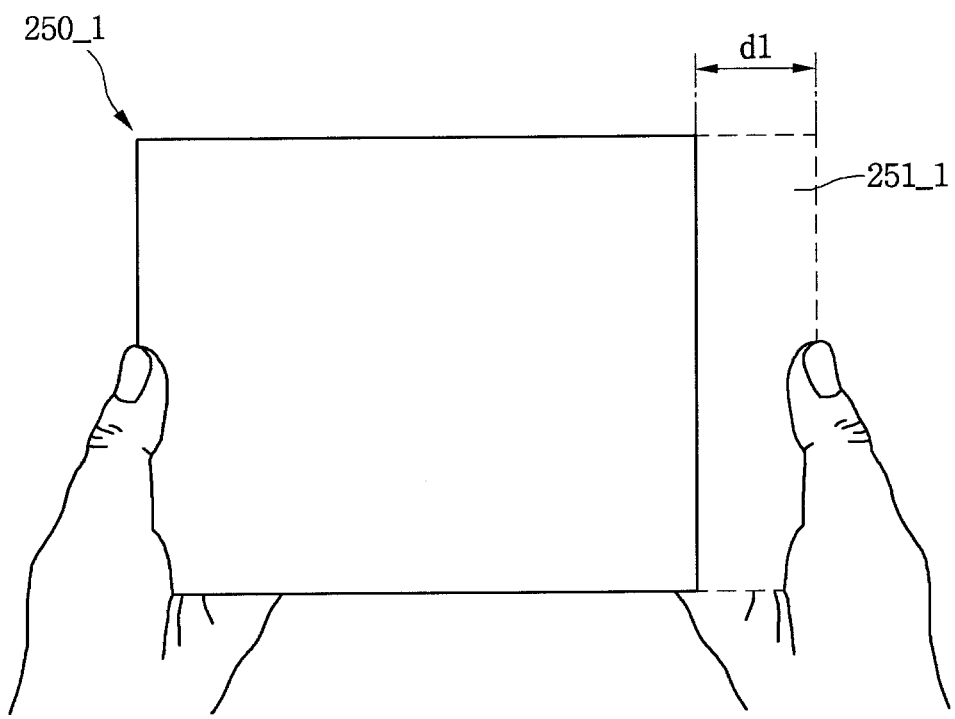

FIGS. 2A and 2B are views illustrating a usage example of a stretchable display device that is an example of a flexible display device.

FIG. 2A illustrates a display unit 250_1 of a state before a stretchable display unit 200_1 is stretched. In this state, when force is applied to the display unit 250_1 in a +x axis direction, the control unit 290, as shown in FIG. 2B, may expand the display unit 250_1 by an expansion distance d1 in the +x axis direction. As the display unit 250_1 expands, it may expand by an expansion area 251_1 corresponding to the expansion distance d1. That is, the screen size of the display unit 250 may be expanded by the expansion area 251_1. Although only a force applied in the +x axis direction is described with reference to FIG. 2, this is just exemplary. On the other hand, when force is applied to the display unit 250_1 in the −x axis direction, the control unit 290 may return the display unit 250_1 to its original size.

FIGS. 3A to 3F are diagrams illustrating a configuration and operation of a rollable display device which is a type of a flexible display device according to an embodiment.

Figure 3A:
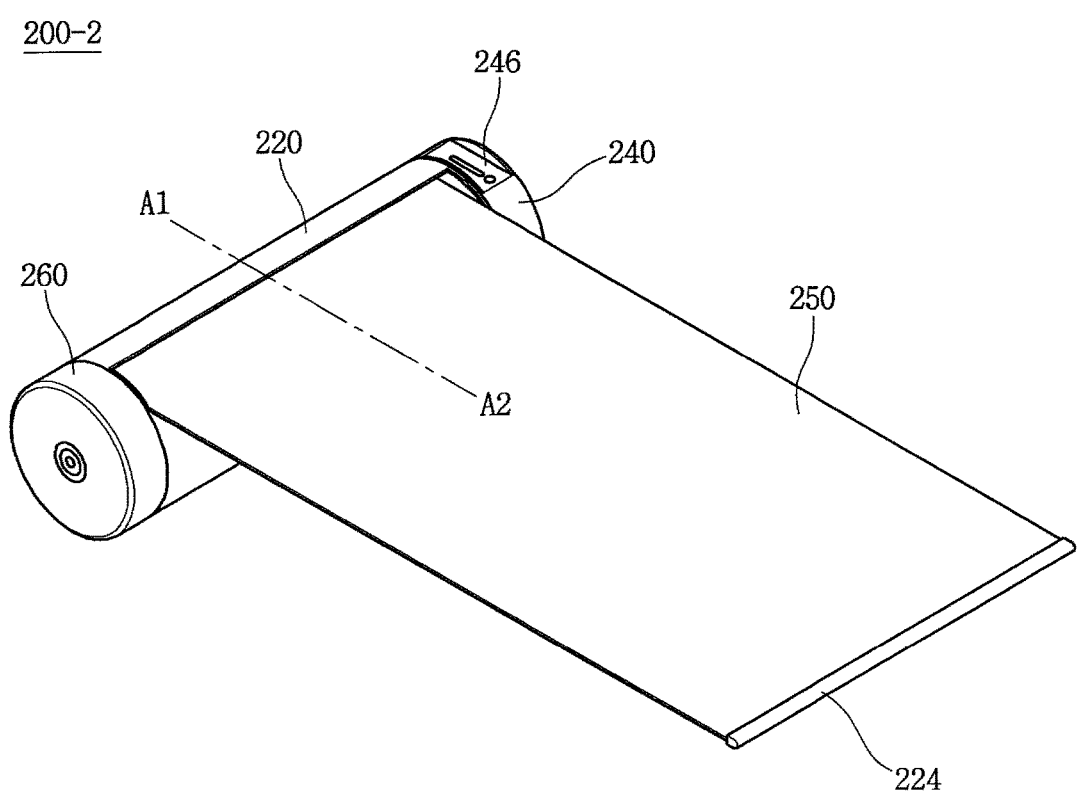
Figure 3B:
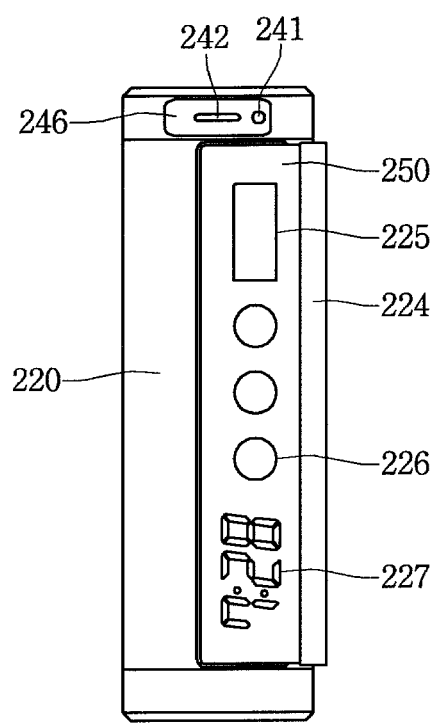
Figure 3C:
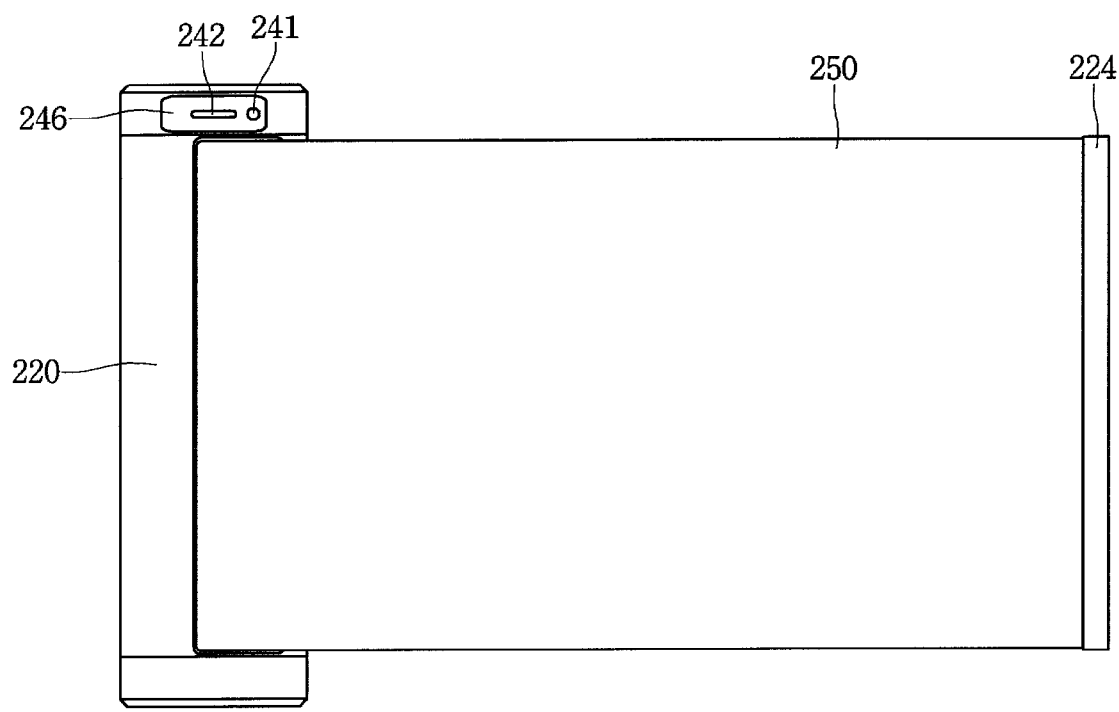
Figure 3D:
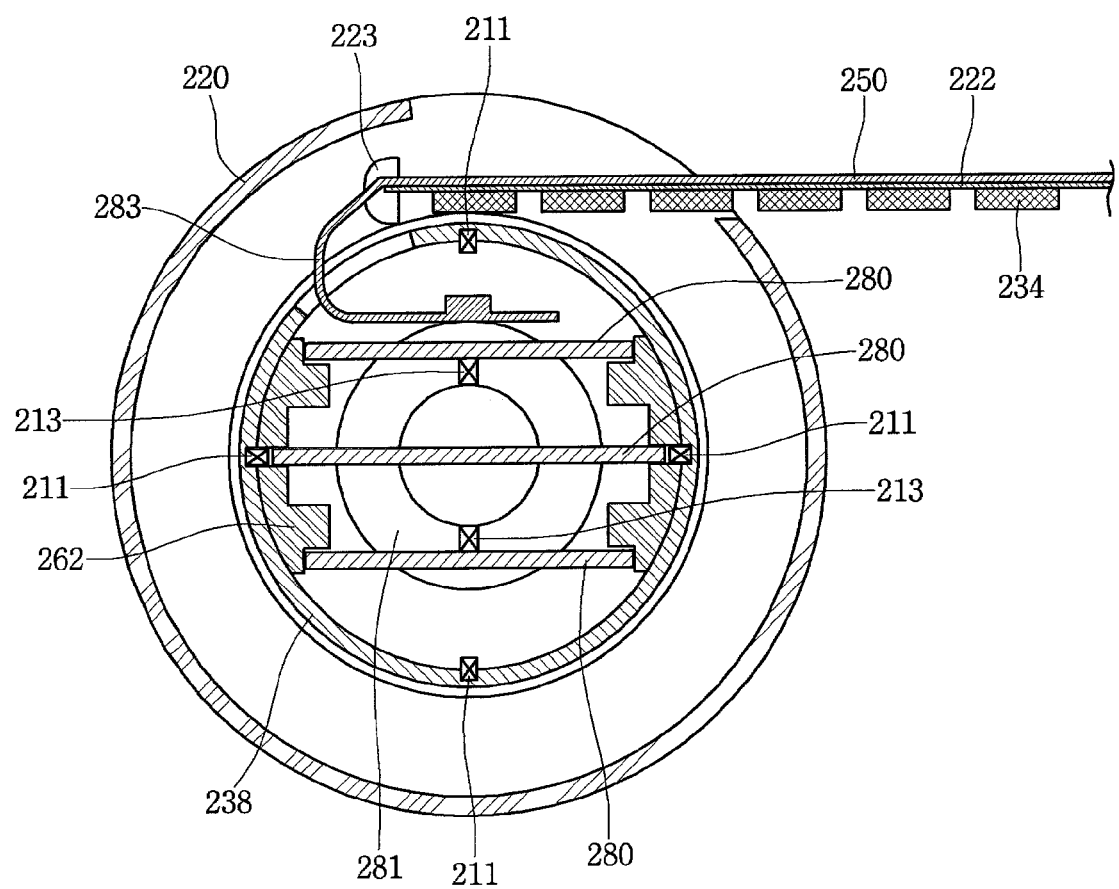
Figure 3F:
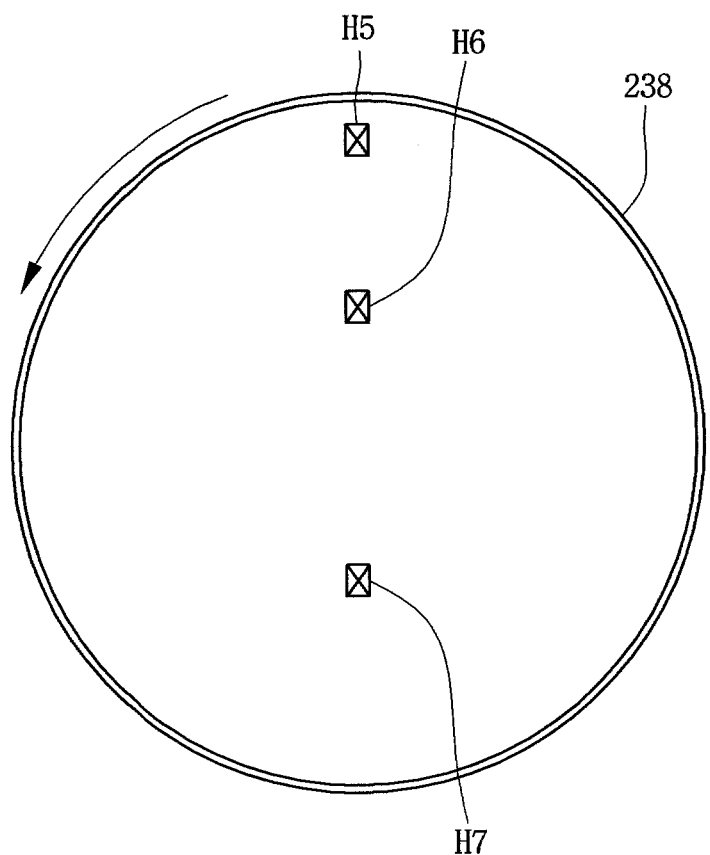

FIG. 3A is a perspective view of the rollable display device according to an embodiment, FIG. 3B is a diagram illustrating the rollable display device that is in a first operation state according to an embodiment, FIG. 3C is a diagram illustrating the rollable display device that is in a second operation state according to an embodiment, FIG. 3D is a cross-sectional view of the rollable display device taken along line A1-A2 of FIG. 3A, and FIGS. 3E and 3F are diagrams illustrating a process of sensing a spread length, a rolled length, or a rotation amount of a display unit using a hall sensor according to an embodiment.

Referring to FIGS. 3A to 3D, a rollable display device 200-2 may include an upper case 240, an intermediate case 220, a lower case 260, a display unit 250, a first holder 223, and a second holder 224.

The upper case 240, the lower case 260, and the intermediate case 220 form an exterior of the rollable display device 200-2. The intermediate case 220 may have a cylindrical shape, but is not limited thereto and may have various shapes such as a hexahedral shape. As illustrated in FIG. 3B or FIG. 3D, a part of the intermediate case 220 may be opened so as to expose a part of the display unit 250.

The upper case 240 and the lower case 260 may cover the intermediate case 220 at an upper side and a lower side thereof. The upper case 240 and the lower case 260 may not expose various components arranged inside the intermediate case 220. A recess part 246 may be formed in the upper case 240, wherein the recess part 246 may be recessed towards the inside of the upper case 240 so as to have a planar shape. At least one of a camera 241 or a sound output unit 242 may be disposed in the recess part 246. The first holder 223 (see FIG. 3D) may be provided to an end portion of one side of the display unit 250, and the second holder 224 may be provided to an end portion of another side of the display unit 250. The first holder 223 may prevent the display unit 250 from escaping from an inner side of the intermediate case 220 when a screen of the display unit 250 is maximally extended. The second holder 224 may prevent the display unit 250 from being rolled into the inner side of the intermediate case 220. A user may draw the second holder 224 in a specific direction to extend the screen of the display unit 250.

The display unit 250 may be rolled in towards the inner side of the intermediate case 220, or may be rolled out of the intermediate case 220. That is, the display unit 250 may be wound, rolled or coiled into the inner side of the intermediate case 220, or may be unwound, unrolled or uncoiled out of the intermediate case 220.

FIG. 3B is a diagram illustrating the first operation state of the rollable display device 200-2, and FIG. 3C is a diagram illustrating the second operation state of the rollable display device 200-2.

In a state in which the display unit 250 is not deformed (e.g., a state of having an infinite radius of curvature, hereinafter referred to as the first operation state), a region displayed by the display unit 250 may be a plane. In a state in which the display unit 250 is deformed by an external force in the first operation state (e.g., a state of having a finite radius of curvature, hereinafter referred to as the second operation state), a region displayed by the display unit 250 may be a curved surface. As illustrated in the drawings, information displayed in the second operation state may be time information output to the curved surface. Such time information may be implemented by individually controlling light emission of sub-pixels arranged in a matrix.

In the first operation state, the display unit 250 may not be flat but curved (e.g., vertically or horizontally curved). In this case, when an external force is applied to the display unit 250, the display unit 250 may be deformed to be flat (or less curved) or more curved.

The display unit 250 may be combined with a touch sensor to implement a flexible touch screen. When the flexible touch screen is touched, a control unit 290 may perform control corresponding to the touch input. The flexible touch screen may detect a touch input not only in the first operation state but also in the second operation state.

The rollable display device 200-2 according to an embodiment may be provided with a deformation detecting unit for detecting deformation of the display unit 250. The deformation detecting unit may be included in the sensing unit 210 (see FIG. 1A).

The deformation detecting unit may be provided to the display unit 250 or the intermediate case 220 so as to detect information on deformation of the display unit 250. Here, the information on deformation may include a deformation direction, a deformation degree, a deformation portion, or a deformation time of the display unit 250 or an acceleration of recovery of the display unit 250 deformed, or may additionally include various information detectable due to warpage of the display unit 250.

Furthermore, the control unit 290 may change information displayed on the display unit 250 or may generate a control signal for controlling a function of the rollable display device 200-2, on the basis of the information on deformation of the display unit 250 detected by the deformation detecting unit.

In an embodiment, the first operation state of the rollable display device 200-2 represents an inactive state in which a minimum display region is exposed to the outside so that basic information alone is displayed. The second operation state of the rollable display device 200-2 represents an active state in which the display unit 250 is extended. Extending of the display unit 250 may indicate that a screen displayed by the display unit 250 is extended. This extending includes gradational extending. A display region of the rollable display device 200-2, which is extended or reduced by rolling the display unit 250, may be implemented at one time at the moment of the extending or reducing, or the display region may be gradually extended or reduced. Therefore, hereinafter all states excepting the first operation state may be regarded as the second operation state, and the second operation state may be classified into a plurality of stages according to a degree of extension.

As illustrated in FIG. 3B, only regions such as a message window 225, an icon 226, or a time display part 227 may be displayed to minimize an exposed region of the display unit 250 in the first operation state. However, in the second operation state, the exposed region of the display unit 250 may be maximized to display information on a larger screen as illustrated in FIG. 3C. It is assumed that FIG. 3C illustrates a state in which the display unit 250 is maximally extended in some cases.

The control unit 290 (see FIG. 1A) may detect an unwound length of the display unit 250, and may turn on/off a part of the display unit 250 on the basis of the unwound length. For example, the control unit 290 may obtain a length of the display unit 250 unwound out of an opened region of the intermediate case 220. The control unit 290 may turn off the display unit 250 disposed inside the intermediate case 220, and may turn on the display unit 250 unwound out of the opened region of the intermediate case 220. Turning on a part of the display unit 250 may represent that power is applied so that the part of the display unit 250 displays information, and turning off a part of the display unit 250 may represent that power is not applied so that the part of the display unit 250 does not display information. Accordingly, since a part of the display unit 250 which is not unwound out of the intermediate case 220 is turned off, unnecessary power consumption and heating may be prevented.

Furthermore, when the display unit 250 is separated from an outer circumferential surface of an inner case 238, the control unit 290 may turn on a separated part of the display unit 250 and may turn off a non-separated part of the display unit 250. The control unit 290 may detect that the display unit 250 is separated from the outer circumferential surface of the inner case 238 using a length sensing unit 211 disposed in an inner circumferential surface of the inner case 238, so as to turn on the separated part of the display unit 250 and turn off the non-separated part of the display unit 250.

Referring to FIG. 3D, a shaft 281, the inner case 238, the length sensing unit 211, a rotation amount sensing unit 213, a plurality of circuit boards 280, a flexible circuit board 283, and a support frame 262 may be arranged in the intermediate case 220.

The shaft 281 may be rotated as the inner case 238 rotates.

The inner case 238 may be shaped like a roller, may be rollable, and may serve to wind or unwind the display unit 250. The inner case 238 is axially connected to the intermediate case 220 so as to be rotatable.

The length sensing unit 211 may sense a wound length or an unwound length of the display unit 250. The length sensing unit 211 may include a magnetic member. The length sensing unit 211 may include at least one hall sensor. The length sensing unit 211 will be described later in more detail.

The rotation amount sensing unit 213 may sense the number of turns of the display unit 250 wound on the inner case 238. That is, the rotation amount sensing unit 213 may sense the number of turns of the display unit 250 wound on the inner case 238 as the display unit 250 is rolled. The rotation amount sensing unit 213 may include a magnetic member. The rotation amount sensing unit 213 may include at least one hall sensor. The rotation amount sensing unit 213 will be described later in more detail.

A plurality of electronic circuit components for operating the rollable display device 200-2 may be mounted on each circuit board 280.

The flexible circuit board 283 may connect electronic circuit components mounted on the inner case 238 to the display unit 250. The electronic circuit component may include at least one of the sensing unit 210, the storage unit 270, or the control unit 290 illustrated in FIG. 1A.

The support frame 262 may support the circuit board 280, and may be disposed in the inner case 238.

The inner case 238 may be rotated by magnetism between the length sensing unit 211 and rolling sensing units 234 spaced apart from each other under the display unit 250. The rolling sensing unit 234 may include a magnetic member, and may include at least one hall sensor. The display unit 250 may be rotated together with the inner case 238 while being rolled on the inner case 238 by the magnetism. In detail, the display unit 250 may be rolled by attraction between the rolling sensing unit 234 and the length sensing unit 211. For example, in the case where the length sensing unit 211 includes an N-pole magnetic member and the rolling sensing unit 234 includes an S-pole magnetic member, they attract each other. A position of the length sensing unit 211 may be fixed. The rolling sensing unit 234 is attracted towards the length sensing unit 211 while moving linearly, and the rolling sensing units 234 spaced apart from each other are continually introduced into the intermediate case 220. Since the rolling sensing unit 234 that has been already introduced and the length sensing unit 211 continuously attract each other, the rolling sensing unit 234 newly introduced and the length sensing unit 211 maintain a balance in terms of attraction so that the rolling sensing units 234 are rotated around the length sensing units 211. By virtue of this mechanism, the display unit 250 is wound while being rolled.

A sheet 222 provided with the rolling sensing unit 234 may be disposed on a lower surface of the display unit 250. The sheet 222 may be included in the display unit 250, or may be present independently from the display unit 250. The sheet 222 may be flexible. For example, the sheet 222 may be silicone or Thermoplastic Poly Urethane (TPU). The sheet 222 may be bonded to the lower surface of the display unit 250 in the form of a sheet frame, may sequentially fix the rolling sensing units 234, and may be formed through bonding, tape or insert molding. Furthermore, the sheet 222 may be formed of a material that is flexible, has excellent elasticity and elongation, and enables maintenance of a small thickness of the sheet 222. This is intended to allow the rolling sensing units 234 to have the same magnetic pole so that the display unit 250 is spread flat by repulsion. That is, the rolling sensing units 234 having the same magnetic pole repel each other by a repulsive force so that the display unit 250 is spread flat.

The length sensing unit 211 may sense magnetism between the rolling sensing unit 234 and the length sensing unit 211 to calculate the wound length or the unwound length of the display unit 250. The rotation amount sensing unit 213 may sense the number of turns of the display unit 250 wound on the outer circumferential surface of the inner case 238. This will be described later in more detail with reference to FIGS. 3E and 3F.

Referring to FIG. 3E, the length sensing unit 211 may include four hall sensors H1 to H4. The four hall sensors are arranged on the inner circumferential surface of the inner case 238 or an inner space thereof along a circumferential direction of the inner case 238, while being spaced apart from each other by a fixed distance. Here, first to fourth hall sensors H1 to H4 sense movement of the rolling sensing unit 234 by sensing a change of magnetism in the circumferential direction of the inner case 238.

The arrows of FIGS. 3E and 3F represent a rotation direction of the inner case 238. The first hall sensor H1 alone senses the rolling sensing unit 234 in the second operation state in which the display unit 250 is maximally exposed as the inner case 238 is rotated. Thereafter, when the inner case 238 is rotated counterclockwise, the display unit 250 is wound on the inner case 238, and the second to fourth hall sensors H2 to H4 sequentially sense the rolling sensing unit 234. As described above, the first to fourth hall sensors H1 to H4 provide information for measuring a length of the display unit 250 wound along the outer circumferential surface of the inner case 238. The control unit 290 may detect a sensor that lastly senses the rolling sensing unit 234 when the display unit 250 is wound or unwound. Accordingly, the control unit 290 may calculate the wound length or the unwound length of the display unit 250. This is the same for the case where the display unit 250 is wound on the inner case 238 by multiple turns.

In the case where the display unit 250 is wound on the outer circumferential surface 238 in two or more layers, magnetism is changed in a radial direction of the inner case 238. Therefore, if a hall sensor for sensing the change is provided, the wound length of the display unit 250 may be measured more accurately.

For example, as illustrated in FIG. 3F, if two or more hall sensors are spaced apart from each other by a fixed distance in a radial direction of the inner case 238, a magnetism change of the rolling sensing unit 234 stacked in two or more layers on the outer circumferential surface of the inner case 238 may be sensed, so that the wound length of the display unit 250 may be calculated more accurately. Although FIG. 3F illustrates three hall sensors, i.e., fifth to seventh hall sensors H5 to H7, this is merely an example. That is, the fifth to seventh hall sensors H5 to H7 sense a magnetism change in a radial direction of the inner case 238 due to the rolling sensing unit 234.

In more detail, in the second operation state (i.e., the state illustrated in FIG. 3D), the control unit 290 may calculate the wound length of the display unit 250 using the first to fourth hall sensors H1 to H4 while the display unit 250 is wound in one layer on the inner case 238. In the case where the display unit 250 is wound in two layers on the inner case 238, the fifth to seventh hall sensors H5 to H7 sense a change of magnetism in a radial direction. The control unit 290 may obtain the number of turns of the display unit 250 wound, using the magnetism change sensed by the fifth to seventh hall sensors H5 to H7. A length of the display unit 250 wound thereafter may be calculated using the first to fourth hall sensors H1 to H4, and, when the display unit 250 is stacked in three layers in a radial direction in which the fifth to seventh hall sensors H5 to H7 are arranged, the magnetism change is sensed by the fifth to seventh hall sensors H5 to H7. As described above, the control unit 290 may calculate the length of the display unit 250 wound on the outer circumferential surface of the inner case 238 using the first to fourth hall sensors H1 to H4, and may calculate the number of turns of the display unit 250 wound on the outer circumferential surface of the inner case 283 using the fifth to seventh hall sensors H5 to H7.

According to another embodiment, the rollable display device 200-2 may be additionally provided with the upper case 240, the intermediate case 220, and the lower case 260 at another end portion of the display unit 250. The elements described above with reference to FIG. 3D may be included in the intermediate case 220. Therefore, a user may grip the rollable display device 200-2 with both hands to extend or reduce the display unit 250.

The flexible display device 200 may include all of a configuration of a mobile terminal 100 described with reference to FIG. 4.

Then, a configuration of a mobile terminal in the flexible display device 200 will be described with reference to FIG. 4.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smartwatchs, smart glasses, and head mounted displays (HMDs)).

However, it is apparent to those skilled in the art that configurations according to embodiments of the present invention disclosed in this specification are applicable to stationary terminals such as digital TVs, desktop computers, and digital signage, except for the case applicable to only mobile terminals.

Figure 4:
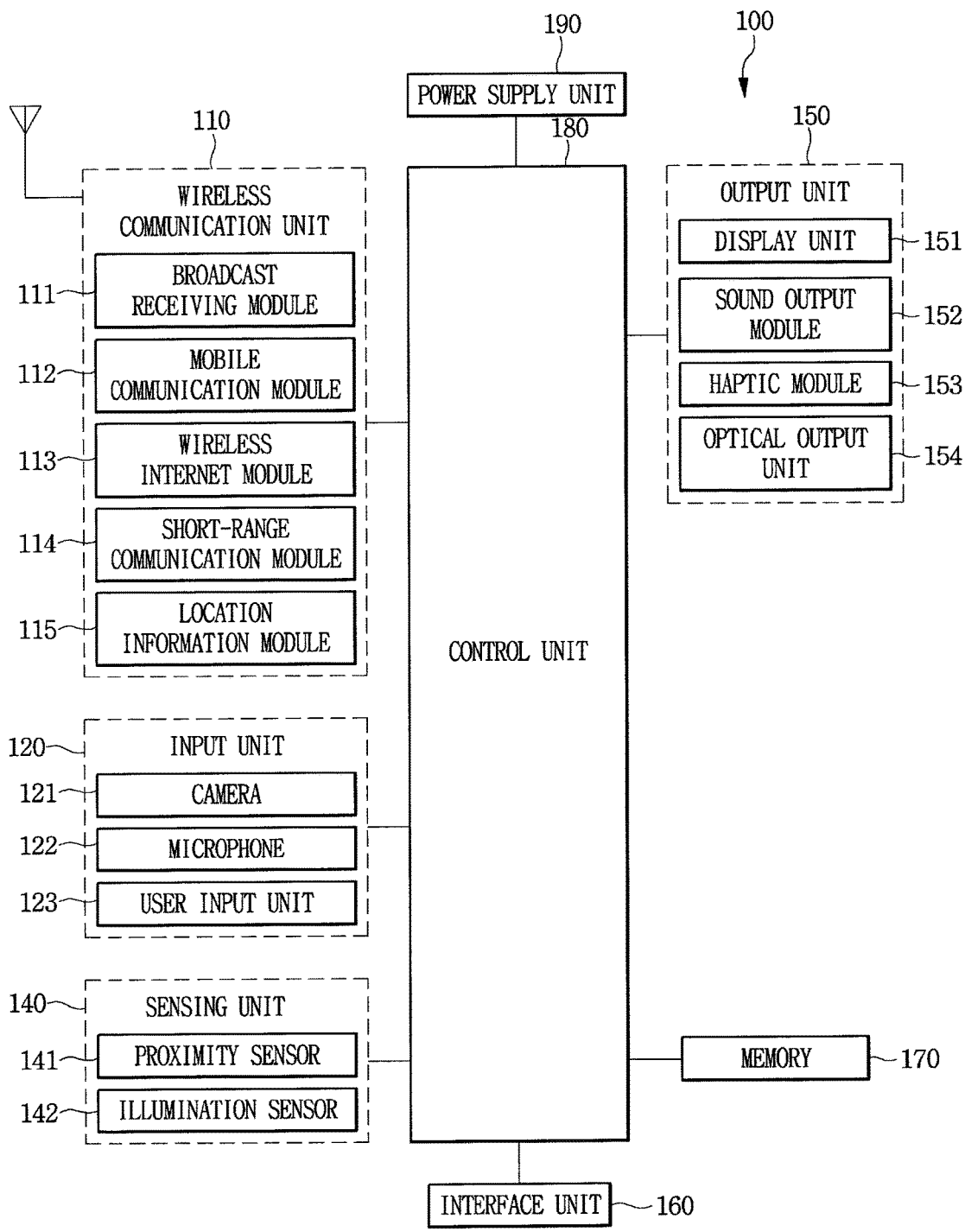
FIG. 4 is a block diagram illustrating a mobile terminal according to an embodiment of the present invention.

FIG. 4 is a block diagram illustrating a mobile terminal according to an embodiment of the present invention.

In this case, the flexible display device 200 may include the components of a mobile terminal 100. Especially, the sensing unit 210 of the flexible display device 200 may perform a function of a sensing unit 140 of the mobile unit 100, the display unit 250 may perform a function of the display unit 151 of the mobile terminal 100, and the storage 270 may perform a function of a memory 170 of the mobile terminal 100.

The mobile terminal 100 may include a wireless communication unit 110, an input unit 120, the sensing unit 140, an output unit 150, an interface unit 160, the memory 170, a control unit 180, and a power supply unit 190. In implementing a mobile terminal, components shown in FIG. 4 are not necessary, so that a mobile terminal described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless internet module 113, a short-range communication module 114, and a location information module 115.

The input unit 120 may include a camera 121 or an image input unit for image signal input, a microphone 122 or an audio input unit for receiving audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information inputted/outputted through the above components or executing application programs stored in the memory 170.

Additionally, in order to execute an application program stored in the memory 170, the control unit 180 may control at least part of the components shown in FIG. 4. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present invention described below. Additionally, the operations, controls, or control methods of a mobile terminal 100 may be implemented on the mobile terminal 100 by executing at least one application program stored in the memory 170.

Hereinafter, prior to examining various embodiments implemented through the mobile terminal 100, the above-listed components are described in more detail with reference to FIG. 4.

First in describing the wireless communication unit 110, the broadcast receiving module 111 of the wireless communication unit 110 may receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching may be provided to the mobile terminal 100.

The mobile communication module 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission.

The wireless Internet module 113 refers to a module for wireless Internet access and may be built in or external to the mobile terminal 100. The wireless internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/ receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

Here, the other mobile terminal 100 may be a wearable device (for example, a smart watch, a smart glass, and an HMD) that is capable of exchanging data (or interworking) with the mobile terminal 100. The short-range communication module 114 may detect (or recognize) a wearable device around the mobile terminal 100, which is capable of communicating with the mobile terminal 100 Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user of the wearable device may use the data processed in the mobile terminal 100 through the wearable device. For example, according thereto, when a call is received by the mobile terminal 100, a user may perform a phone call through the wearable device or when a message is received by the mobile terminal 100, a user may check the received message.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position on the basis of information of a wireless access point (AP) transmitting/receiving a wireless signal to/from the Wi-Fi module, through the Wi-Fi module. If necessary, the position information module 115 may perform a function of another module in the wireless communication unit 110 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 120 is used for inputting image information (or signal), audio information (or signal), data, or information inputted from a user and the mobile terminal 100 may include at least one camera 121 in order for inputting image information. The camera 121 processes image frames such as a still image or a video obtained by an image sensor in a video call mode or a capturing mode. The processed image frame may be displayed on the display unit 151 or stored in the memory 170. Moreover, a plurality of cameras 121 equipped in the mobile terminal 100 may be arranged in a matrix structure and through the camera 121 having such a matrix structure, a plurality of image information having various angles or focuses may be inputted to the input terminal 100. Additionally, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the control unit may control an operation of the mobile terminal 100 to correspond to the inputted information. The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and may be disposed on a touch screen and for example, may include graphic, text, icon, video, or a combination thereof.

Moreover, the sensing unit 140 may sense at least one of information in a mobile terminal, environmental information around a mobile terminal, and user information and may then generate a sensing signal corresponding thereto. On the basis of such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor detects a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressured when touched, and a capacitance when touched. Here, the touch target, as an object applying a touch on the touch sensor, may be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-mentioned touch sensor and proximity sensor are provided separately or combined and may thus sense various types of touches, for example, short (or tap) touch), long touch, multi touch, drag touch, flick touch, pinch-in touch, pinch-out touch, swipe touch, and hovering touch for the touch screen.

The ultrasonic sensor may recognize position information of a detection target by using ultrasonic waves. Moreover, the control unit 180 may calculate the position of a wave source through information detected by an optical sensor and a plurality of ultrasonic sensors. The position of the wave source may be calculated by using the property that light is much faster than ultrasonic wave, that is, a time that light reaches an optical signal is much shorter than a time that ultrasonic wave reaches an ultrasonic sensor. In more detail, the position of the wave source may be calculated by using a time difference with a time that ultrasonic wave reaches by using light as a reference signal.

Moreover, the camera 121 described as a configuration of the input unit 120 may include at least one of a camera sensor (for example, CCD and CMOS), a photo sensor (or an image sensor), and a laser sensor.

The camera 121 and the laser sensor may be combined to detect a touch of a detection target for a three-dimensional image. The photo sensor may be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Additionally, the display unit 151 may be configured as a three-dimensional display unit displaying a three-dimensional image.

A three-dimensional display method, for example, a stereoscopic method (a glasses method), an autostereoscopic (no glasses method), a projection method (a holographic method) may be applied to the three-dimensional display unit The sound output unit 152 may output audio data received from the wireless communication unit 110 or stored in the memory 170 in a call signal reception or call mode, a recording mode, a voice recognition mode, or a broadcast reception mode. The sound output unit 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal outputted from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal 100 is accurately mounted on the cradle.

The memory 170 may store a program for an operation of the control unit 180 and may temporarily store input/output data (for example, a phone book, a message, a still image, and a video). The memory 170 may store data on various patterns of vibrations and sounds outputted during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an output of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various embodiments described below on the mobile terminal 100.

The power supply unit 190 may receive external power or internal power under a control of the control unit 180 and may then supply power necessary for an operation of each component. The power supply unit 190 includes a battery. The battery is a rechargeable built-in battery and may be detachably coupled to a terminal body in order for charging.

Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Moreover, various embodiments below may be implemented in a computer or device similar thereto readable medium by using software, hardware, or a combination thereof.

Then, a communication system using the mobile terminal 100 is described according to an embodiment of the present invention.

First, the communication system may use different wireless interfaces and/or physical layers. For example, a wireless interface available to the communication system may include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present invention is applicable to all communication systems including Orthogonal Frequency Division Multiplexing (OFDM) wireless communication systems in addition to CDMA wireless communication systems.

The CDMA wireless communication system may include at least one terminal 100, at least one base station (BS) (it may be referred to as Node B or Evolved Node B), at least one base station controllers (BSCs), and a mobile switching center (MSC). MSC may be configured to be connected to Public Switched Telephone Network (PSTN) and BSCs. BSCs may be connected being paired with a BS through a backhaul line. The backhaul line may be provided according to at least one of E1/T1, ATM, IP, PPP, Frame Relay, HDSL, ADSL, and xDSL. Accordingly, a plurality of BSCs may be included in a CDMA wireless communication system.

Each of a plurality of BSs may include at least one sensor and each sensor may include an omni-directional antenna or an antenna indicating a specific radial direction from a BS. Additionally, each sensor may include at least two antennas in various forms. Each BS may be configured to support a plurality of frequency allocations and each of the plurality of frequency allocations may have a specific spectrum (for example, 1.25 MHz, 5 MHz, and so on).

The intersection of a sector and a frequency allocation may be referred to as a CDMA channel. A BS may be referred to as a Base Station Transceiver Subsystem (BTS). In such a case, one BSC and at least one BS together may be referred to as "BS". A BS may also represent "cell site". Additionally, each of a plurality of sectors for a specific BS may be referred to as a plurality of cell sites.

A Broadcasting Transmitter (BT) transmits broadcast signals to the terminals 100 operating in a system. The broadcast reception module 111 shown in FIG. 36 is provided in the terminal 100 for receiving broadcast signals transmitted from the BT.

Additionally, GPS may be linked to a CDMA wireless communication system in order to check the location of the mobile terminal 100. Then, a satellite helps obtaining the location of the mobile terminal 100. Useful location information may be obtained by at least one satellite. Herein, the location of the mobile terminal 100 may be traced by using all techniques for tracing the location in addition to GPS tracking technique. Additionally, at least one GPS satellite may be responsible for satellite DMB transmission selectively or additionally.

The location information module 115 in a mobile terminal is for detecting and calculating the position of the mobile terminal and its representative example may include a GPS module and a WiFi module. If necessary, the position information module 115 may perform a function of another module in the wireless communication unit 110 in order to obtain data on the location of the mobile terminal substitutionally or additionally.

The GPS module 115 may calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 may speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) may be utilized.

WPS is a technique for tracking the location of the mobile terminal 100 by using a WiFi module in the mobile terminal 100 and a wireless Access Point (AP) for transmitting or receiving wireless signals to or from the WiFi module and may mean a Wireless Local Area Network (WLAN) based location measurement technique using WiFi.

A WiFi location tracking system may include a WiFi location measurement server, a mobile terminal 100, a wireless AP connected to the mobile terminal 100, and a database for storing arbitrary wireless AP information.

The mobile terminal 100 in access to a wireless AP may transmit a location information request message to a WiFi location measurement server.

The WiFi location measurement server extracts information of a wireless AP connected to the mobile terminal 100 on the basis of a location information request message (or signal) of the mobile terminal 100. Information of a wireless AP connected to the mobile terminal 100 may be transmitted to the WiFi location measurement server through the mobile terminal 100 or may be transmitted from a wireless AP to a WiFi location measurement server.

Based on the location information request message of the mobile terminal 100, the extracted information of a wireless AP may be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server may extract wireless AP information corresponding to a wireless AP that the mobile terminal 100 access from a pre-established database by using information of the wireless AP connected to the mobile terminal 100. At this point, information of arbitrary wireless APs stored in the database may information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server may extract only a predetermined number of wireless AP information in high RSSI order.

Then, the WiFi location measurement server may extract (or analyze) the location information of the mobile terminal 100 by using at least one wireless AP information extracted from the database. By comparing the included information and the received wireless AP information, location information of the mobile terminal 100 is extracted (or analyzed).

As a method of extracting (or analyzing) the location information of the motile terminal 100, a Cell-ID method, a finger-print method, a triangulation method, and a landmark method may be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but when the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) may be used.

The landmark method is a method for measuring the location of a mobile terminal by using a landmark transmitter knowing the location.

In addition to the listed methods, a variety of algorithms may be utilized as methods for extracting (or analyzing) the location information of a mobile terminal.

As the extracted location information of the mobile terminal 100 is transmitted to the mobile terminal 100 through the WiFi location measurement server, the mobile terminal 100 may obtain the location information.

As connected to at least one wireless AP, the mobile terminal 100 may obtain location information. At this point, the number of wireless APs, which are required for obtaining the location information of the mobile terminal 100, may vary according to a wireless communication environment where the mobile terminal 100 is located.

Then, various embodiments for an operating method of the flexible display device 200 are described. Embodiments of the present invention may be applied to the stretchable display device 200_1 described with reference to FIGS. 2A to 2B and the rollable display device 200_2 described with reference to FIGS. 3A to 3C.

Figure 5:
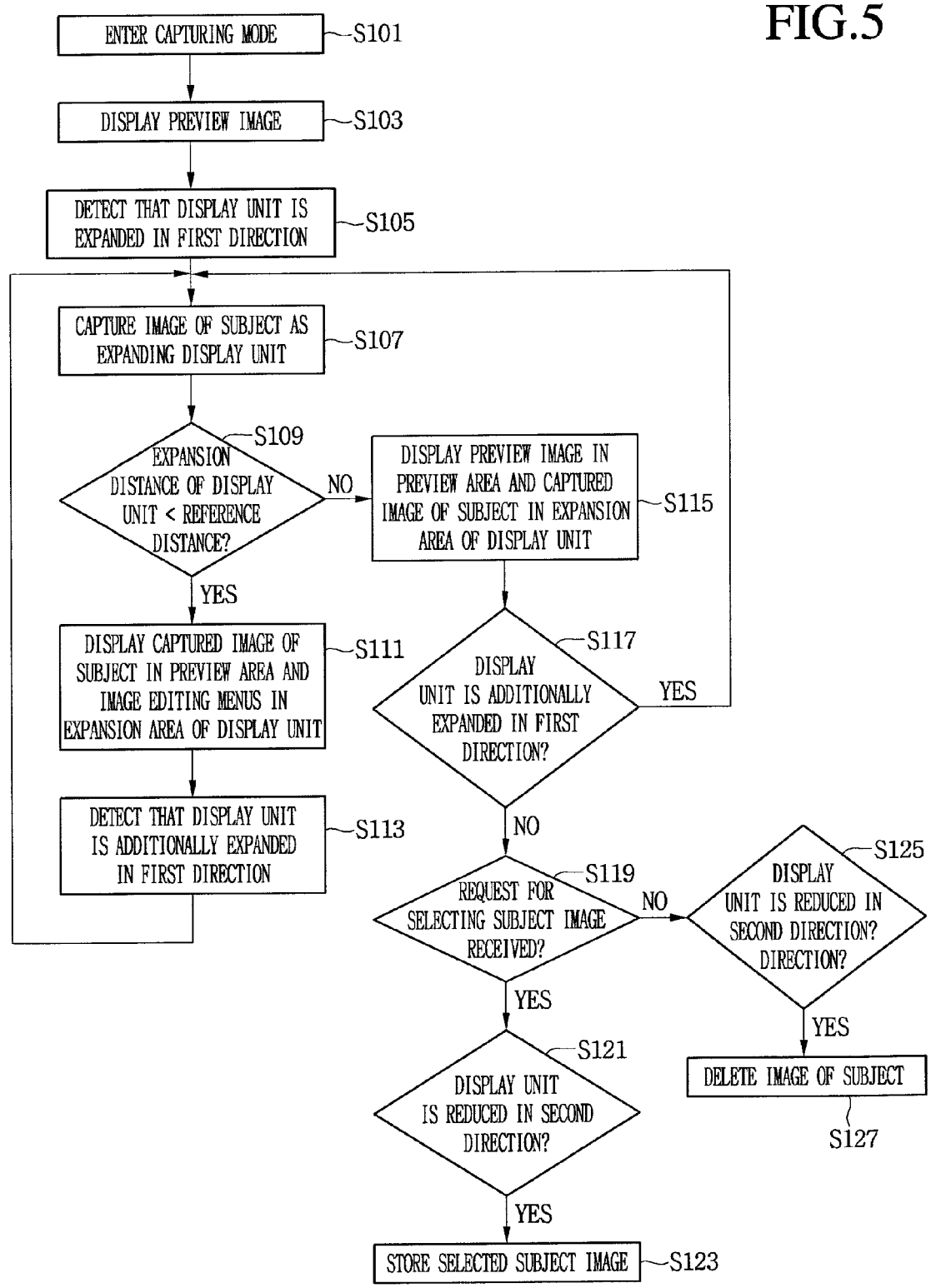
FIG. 5 is a flowchart illustrating an operating method of a flexible display device according to another embodiment of the present invention.

FIG. 5 is a flowchart illustrating an operating method of a flexible display device according to another embodiment of the present invention.

The control unit 290 allows an operating mode of the flexible display device 200 into a capturing mode in operation S101 and displays the image of a subject through a preview area of the display unit 250 in operation S103. According to an embodiment of the present invention, the capturing mode may be a mode for capturing a subject through the camera 121 included in the flexible display device 200. The camera 121 may be disposed on at least one of the front and the back of the display unit 250.

The preview area of the display unit 250 may be an area for displaying the image of a subject when the flexible display device 200 is not deformed or the display unit 250 is expanded. The size of the preview area may be adjusted according to a setting. Operation S101 and operation S103 will be described with reference to FIG. 6.

Figure 6:
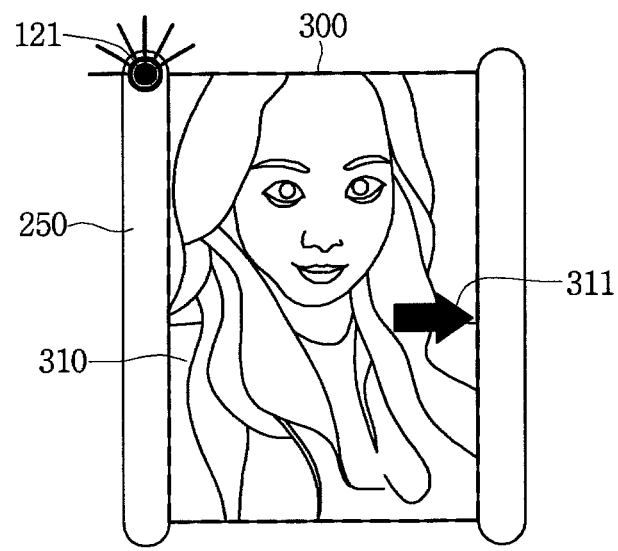
FIG. 6 is a view when a flexible display device enters a capturing mode according to an embodiment of the present invention.

FIG. 6 is a view when a flexible display device enters a capturing mode according to an embodiment of the present invention.

Although it is assumed below that the flexible display device 200 is the rollable display device 200_2, the present invention is not limited thereto and this may be applicable to the stretchable display device 200_1.

Referring to FIG. 6, the rollable display device 200_2 may be already in a state of entering a capturing mode and the display unit 250 may display an image 310 of a subject inputted through the camera 121, in the preview area 300. According to an embodiment of the present invention, the preview area 300 may be an area representing a screen before the display unit 350 is deformed. According to another embodiment of the present invention, the preview area 300 may be an area representing a screen when the display unit 250 is expanded by a predetermined area before deformation.

The size of the preview area 300 may vary according to a setting. The size of the preview area 300 may be identical to or less than the size of an area that the display unit 250 is expanded by a predetermined area. As shown in FIG. 6, the size of the preview area 300 is identical to the size of an area that the display unit 250 is expanded by a predetermined area.

Moreover, the control unit 290 may perform a control on the display unit 250 to display in the preview area 300 a capture indicator representing that it is possible to capture the image 310 of the subject as the display unit 250 is expanded in the +x axis direction.

Again, FIG. 5 is described.

The control unit 290 detects that the display unit 250 is expanded in the first direction through the sensing unit 210 in operation S105 and captures the image of a subject displayed in a preview area as expanding the display unit 250 in operation 107. Expanding the display unit 250 may represent expanding the size of the screen that the display unit 250 displays.

While a preview image is displayed in a preview area, if the display unit 250 in the first direction is expanded, the control unit 290 may capture the image of a subject displayed in the preview area as expanding the display unit 250. The control unit 290 may capture the image of a subject displayed in the preview area if an expansion distance of the display unit 250 is greater that a predetermined distance. The control unit 290 may control the sound output unit 152 to output a capture sound that notifies that the image of a subject is captured upon capturing the image of the subject.

According to another embodiment of the present invention, the control unit 290 may capture the image of a subject on the basis of a speed at which the display unit 250 is expanded in the first direction. For example, if a speed at which the display unit 250 is expanded in the first direction is equal to or greater than a reference speed, the control unit 290 may capture the image of a subject and when if the speed is less than the reference speed, may not capture the image of the subject. If the speed at which the display unit 250 is expanded is less than the reference speed, the control unit 290 may perform a control on the display unit 250 to display image editing menus described later in an expansion area.

The control unit 290 checks whether an expansion distance representing a distance that the display unit 250 is expanded is less than a reference distance in operation S109. According to an embodiment of the present invention, the expansion distance of the display unit 250 may be a distance that the screen of the display unit 250 is expanded in correspondence to the intensity of a force applied to the display unit 250.

According to an embodiment of the present invention, the reference distance may be a distance that is a reference for displaying the captured image of a subject in an expansion area of the display unit 250. That is, when the expansion distance of the display unit 250 is greater than the reference distance, the control unit 290 may perform a control on the display unit 250 to display the captured image of a subject in an expansion area of the display unit 250. When the expansion distance of the display unit 250 is less than the reference distance, the control unit 290 may perform a control on the display unit 250 to display image editing menus for editing the captured image of a subject in an expansion area of the display unit 250.

When the expansion distance of the display unit 250 is less than the reference distance, the control unit 290 displays the captured image of a subject in a preview area and may display image editing menus in an expansion area corresponding to the expansion distance of the display unit 250.

According to an embodiment of the present invention, each of image editing menus may be a menu for editing the captured image of an image. Operation S111 will be described with reference to FIG. 7.

Figure 7:
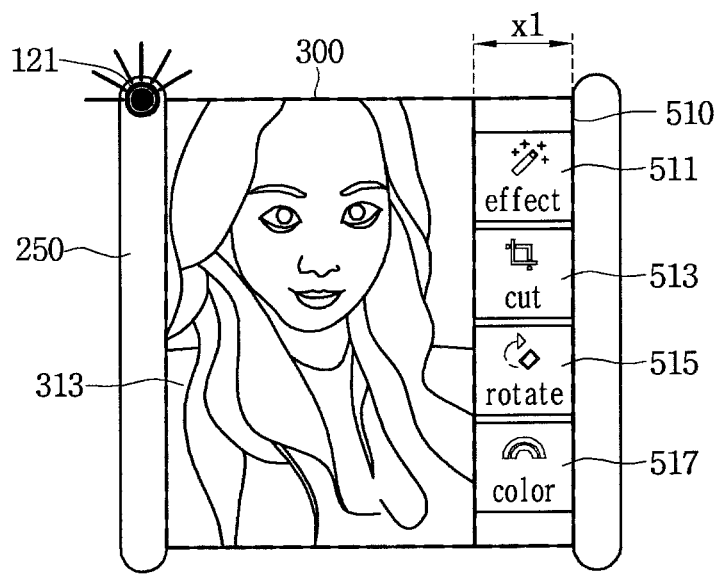
FIG. 7 is a view of displaying the captured image of a subject and image editing menus when a display unit is expanded by less than a reference distance according to an embodiment of the present invention.

FIG. 7 is a view of displaying the captured image of a subject and image editing menus when a display unit is expanded by less than a reference distance according to an embodiment of the present invention.

Referring to FIG. 7, the display unit 250 is in a state of being expanded in the +x axis direction by a first expansion distance x1. The first expansion distance x1 may be less than a reference distance. As the display unit 250 is expanded by the first expansion distance x1, the screen size of the display unit 250 may become larger by the first expansion area 510. The control unit 290 may perform a control on the display unit 250 to display a captured first image 313 in the preview area 300 and display a plurality of image editing menus 511, 513, 515, and 517 for editing the captured first image 313 in the first expansion area 510 of the display unit 250. The first image editing menu 511 may be a menu for providing various effects to the first image 313. The second image editing menu 513 may be a menu for cutting out a specific portion of the first image 313. The third image editing menu 515 may be a menu for rotating the first image 313. The fourth image editing menu 517 may be a menu for adjusting the color of the first image 313.

According to another embodiment of the present invention, the control unit 290 may control the display unit 250 to display image editing menus on the basis of a speed at which the display unit 250 is expanded. If the speed at which the display unit 250 is expanded is less than the reference speed, the control unit 290 may perform a control on the display unit 250 to display image editing menus in an expansion area. Moreover, if the speed at which the display unit 250 is expanded is equal to or greater than the reference speed, the control unit 290 may continuously capture the image of a subject in correspondence to an area corresponding to a reference distance.

A user may easily edit a just captured picture only with an operation for expanding the display unit 250.

Again, FIG. 5 is described.

While displaying the image of a subject and image editing menus, if the display unit 250 in the first direction is additionally expanded in operation S113, the method returns to operation S107.

Moreover, when expanding the display unit 250 by a reference distance, the control unit 290 may control the display unit 250 to display a re-capturing indicator representing that re-capturing is available. This will be described with reference to FIG. 8.

Figure 8:
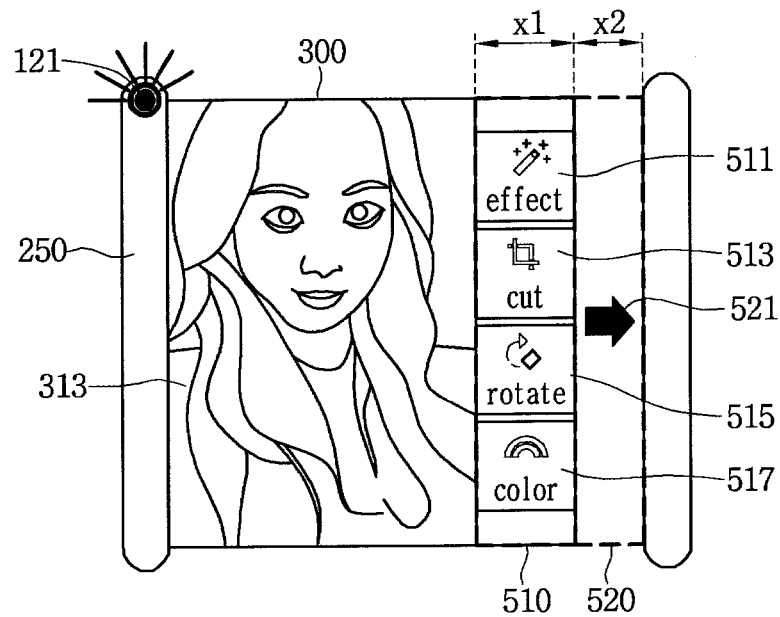
FIG. 8 is a view of displaying a re-capturing indicator in an expansion area of the display unit 250 when a display unit is expanded by less than a reference distance according to an embodiment of the present invention.

FIG. 8 is a view of displaying a re-capturing indicator in an expansion area of the display unit 250 when a display unit is expanded by less than a reference distance according to an embodiment of the present invention.

Referring to FIG. 8, as an additional force is applied in the +x axis direction, the display unit 250 may be expanded by a second expansion distance x2. The sum of the first expansion distance x1 and the second expansion distance x2 may be less than a reference distance. When the sum of the first expansion distance x1 and the second expansion distance x2 is less than a reference distance, the control unit 290 may perform a control on the display unit 250 to display a re-capturing indicator 521 representing that re-capturing is available in the second expansion area 520 corresponding to the second expansion distance x2.

A user may re-capture a subject while viewing a just captured picture only with an operation for expanding the display unit 250.

Again, FIG. 5 is described.

Moreover, when the expansion distance of the display unit 250 is equal to or greater than a reference distance, the control unit 290 displays a preview image in a preview area and displays the captured image of the subject in an expansion area of the display unit 250 in operation S115. Operation S115 will be described with reference to FIG. 9.

Figure 9:
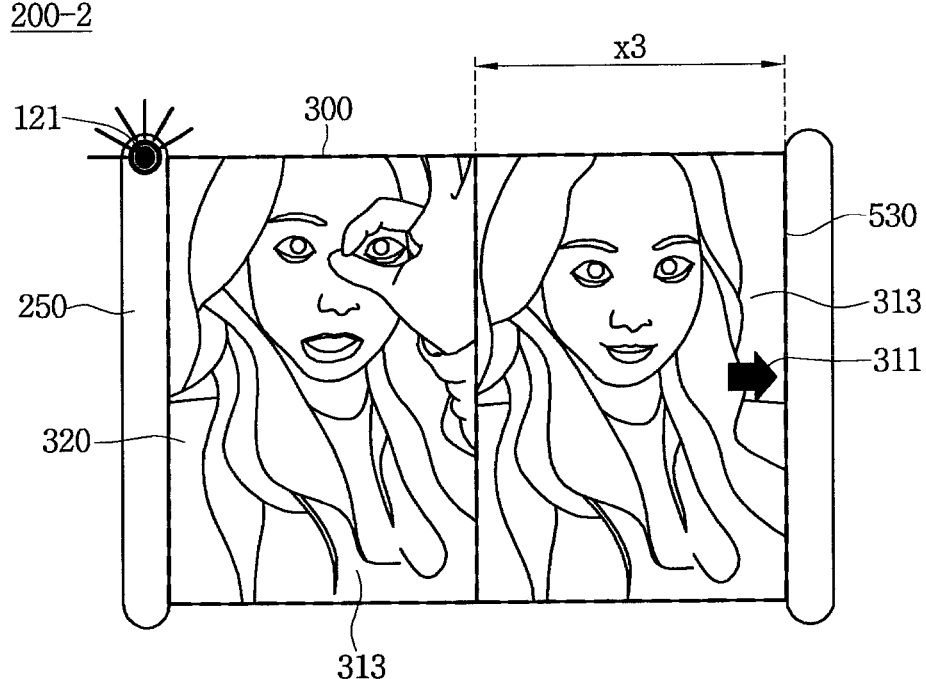
FIG. 9 is a view illustrating an operation of a display unit when the display unit is expanded by more than a reference distance according to an embodiment of the present invention.

FIG. 9 is a view illustrating an operation of a display unit when the display unit is expanded by more than a reference distance according to an embodiment of the present invention.

Referring to FIG. 9, as show in a state of FIG. 8, the display unit 280 may be expanded by a reference distance greater than the first expansion distance x1 and the second expansion distance x2. For example, the display unit 250 may be expanded by a third expansion distance x3. The third expansion distance x3 may be identical to or greater than a reference distance. Hereinafter, it is assumed and described that the third expansion distance x3 is identical to a reference distance.

The control unit 290 may perform a control on the display unit 250 to display a preview image 320 of a subject in the preview area 300 and display the previously captured first image 313 in the third expansion area 530 corresponding to the third expansion distance x3. Through this, a user may compare the previously captured picture and a preview image. Moreover, the control unit 290 may perform a control on the display unit 250 to display in the third expansion area 530 a capture indicator representing that it is possible to capture the image 320 of the subject as additionally expanding the display unit 250 in the +x axis direction.

Again, FIG. 5 is described.

The control unit 290 checks whether the display unit 250 is additionally expanded in the first direction in operation S117 and if the display unit is additionally expanded, returns to operation S107. That is, when an additional force for expanding the display unit 250 in the +x axis direction is applied as shown in FIG. 9, the control unit 290 may capture the image 320 of a subject displayed in the preview area 300. In such a way, the control unit 290 may continuously capture a subject by expanding the display unit 250 by a predetermined area. Additionally, as shown in a state of FIG. 9, when the display unit 250 is expanded by less than a reference distance, a plurality of image editing menus described with reference to FIG. 8 may be displayed in an expanded area. This will be described with reference to FIG. 10.

Figure 10:
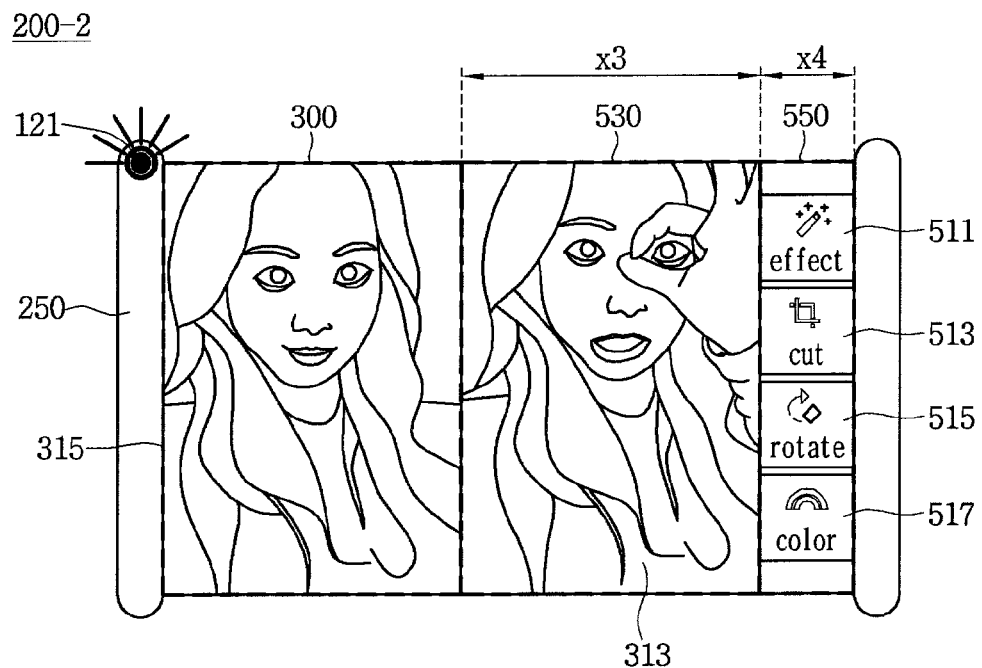
FIG. 10 is a view of displaying the captured image of a subject and image editing menus when a display unit is expanded by less than a reference distance according to an embodiment of the present invention.

FIG. 10 is a view of displaying the captured image of a subject and image editing menus when a display unit is expanded by less than a reference distance according to an embodiment of the present invention.

Especially, FIG. 10 is a view describing a case that an additional force is applied in the +x axis direction when the display unit 250 is expanded by a third expansion area 530 in a state of FIG. 9.

Referring to FIG. 10, the display unit 250 is in a state of being expanded by the third expansion distance x3 and the fourth expansion distance x4. The fourth expansion distance x4 may be less than a reference distance. As the display unit 250 is expanded by the first expansion distance x1, the screen size of the display unit 250 may become larger by the fourth expansion area 550. The control unit 290 may perform a control on the display unit 250 to display the first image 313 of a subject in the third expansion area 530, display the second image 315 of the most recently captured subject in the preview area 300, and display a plurality image editing menus 511, 513, 515, and 517 in the fourth expansion area 550.

Moreover, when the display unit 250 is additionally expanded by a reference distance in a state of FIG. 10, the control unit 290 may perform a control on the display unit 250 to display a preview image of a subject in the preview area 300 and display the captured images in expansion areas, respectively. This will be described with reference to FIG. 11.

Figure 11:
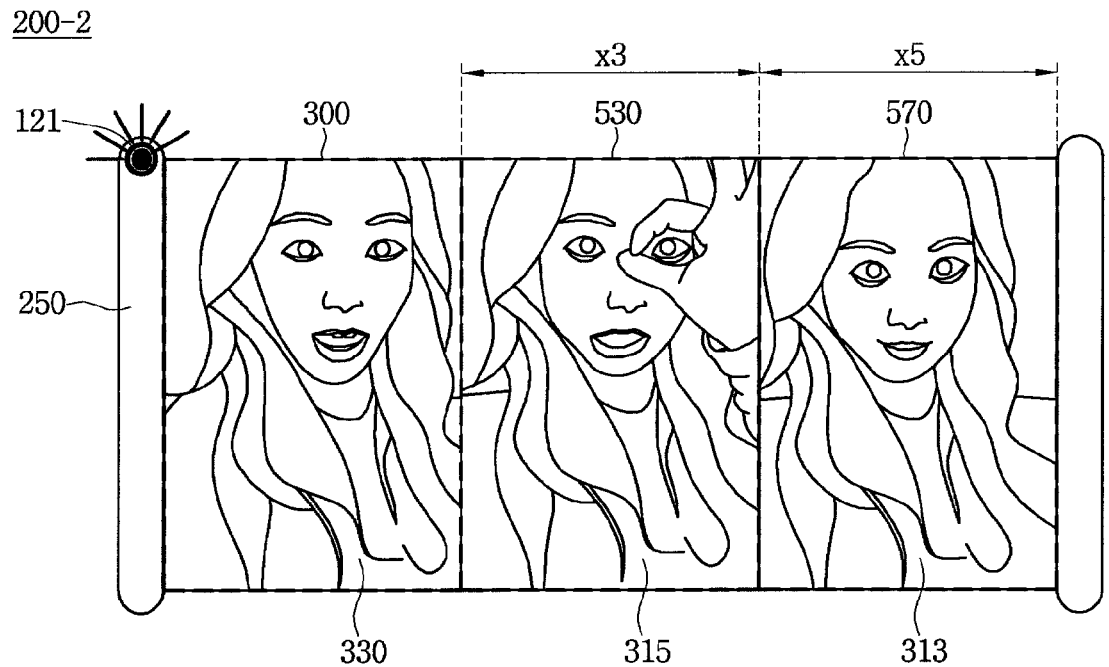
FIG. 11 is a view illustrating an operation of a display unit when the display unit is expanded by more than a reference distance according to another embodiment of the present invention.

FIG. 11 is a view illustrating an operation of a display unit when the display unit is expanded by more than a reference distance according to another embodiment of the present invention.

It is assumed in FIG. 11 that the display unit 250 is additionally expanded by a reference distance in a state of FIG. 10. Referring to FIG. 11, the display unit 250 may be expanded by a third expansion distance x3 and a fifth expansion distance x5. The fifth expansion distance x5 may be identical to or greater than a reference distance. Hereinafter, it is assumed and described that the fifth expansion distance x5 is identical to a reference distance.

The control unit 290 may control the display unit 250 to display a preview image 330 of a subject in the preview area 300, display the second image 315 of the most recently captured subject in the third expansion area 530, and display the first image 313 of a subject in the fifth expansion area 550. However, the present invention is not limited thereto and the first image 313 of a subject may be displayed in the third expansion area 530 and the second image 315 of the most recently captured subject may be displayed in the fifth expansion area 570.

A user may capture the image of the preview area 300 according to expanding the display unit 250 in the +x axis direction.

Moreover, when the display unit 250 by the fifth expansion distance x5 is reduced, the control unit 290 may delete the first image 313. A user may delete the captured image of a subject and perform re-capturing by reducing as much as a previous expansion area.

Again, FIG. 5 is described.

Moreover, when the display unit 250 is not additionally expanded in the first direction in operation S117, the control unit 290 checks whether a request for selecting the image of a subject displayed on the display unit 250 is received in operation S119.

According to an embodiment of the present invention, a request for selecting the image of a subject may be a touch input for touching the subject.

When the request for selecting the image of a subject is received, the control unit 290 detects that the display unit 250 is reduced in a second direction opposite to the first direction in operation S121 and stores the selected image of the subject through the storage unit 270 while reducing the display unit 250 in operation S123. According to an embodiment of the present invention, reducing the display unit 250 may represent reducing the size of the screen that the display unit 250 displays.

Moreover, when the request for selecting the image of a subject displayed on the display unit 250 is received in operation S119, the control unit 290 detects that the display unit 250 is reduced in a second direction opposite to the first direction in operation S125 and deletes the subject image displayed in an area where the display unit 250 is reduced in operation S127.

Operation S119 to S127 will be described with reference to the drawings.

Figure 12:
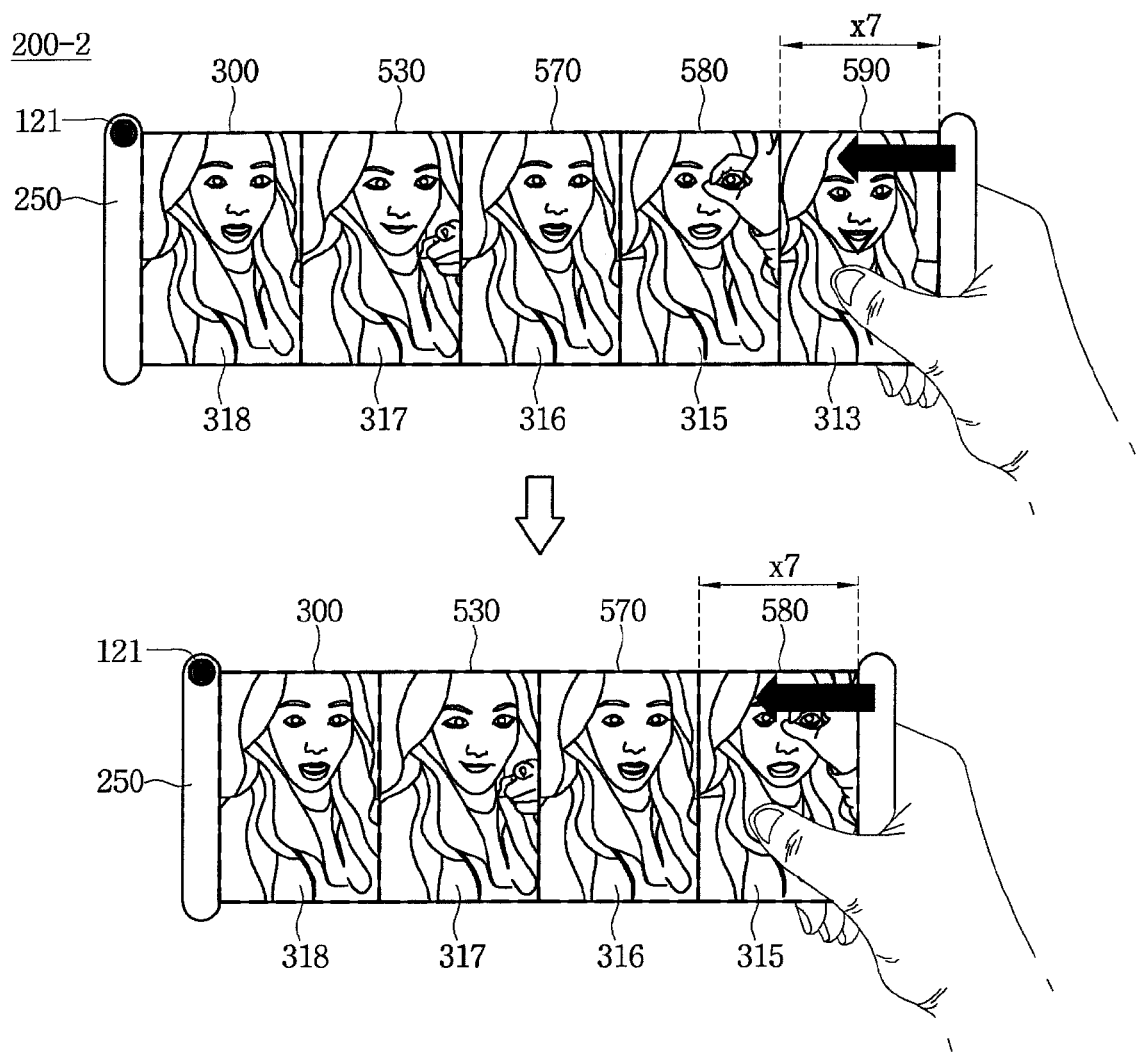
FIG. 12 is a view of storing a specific image among continuous captured images according to an embodiment of the present invention.

FIG. 12 is a view of storing a specific image among continuous captured images according to an embodiment of the present invention.

Referring to FIG. 12, the display unit 250 of which screen size is expanded displays five subject images. It is assumed that the preview area 300 is an expansion area where the display unit 250 is expanded. A plurality of temporarily stored subject images 318, 317, 316, 315, and 313 may be respectively displayed in a plurality of expansion areas 300, 530, 570, 580, and 590 as the display unit 250 is expanded. After a request for selecting a first image 313 among a plurality of subject images 318, 317, 316, 315, and 313 is received, if a force for reducing the display unit 250 by a reference distance x7 in the −x axis direction is detected, the control unit 290 may perform a control on the storage unit 270 to store the selected first image 313 as reducing an area corresponding to the reference distance x7. A user may store only favorite images among a plurality of continuously captured subject images.

On the other hand, if the second image 315 is not selected and a force for reducing the display unit 250 by a reference distance x7 in the −x axis direction is detected, the control unit 290 may perform a control on the storage unit 270 to delete the not-selected temporarily stored second image 315 as reducing an area corresponding to the reference distance x7. If not like a just captured image, a user may perform re-capturing by reducing the screen size of the display unit 250 by an expansion area.

Then, it is described that the number of continuous shooting available images may vary according to the size of a preview area.

Figure 13A:
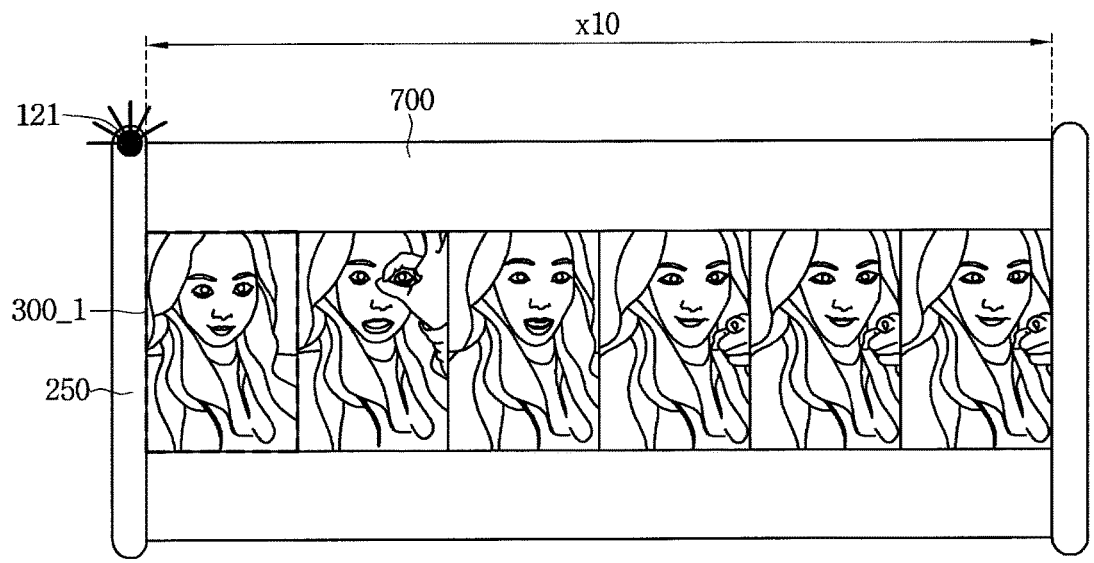
FIGS. 13A and 13B are views illustrating that the number of continuous shooting available images varies depending on the size of a preview area according to an embodiment of the present invention.
Figure 13B:
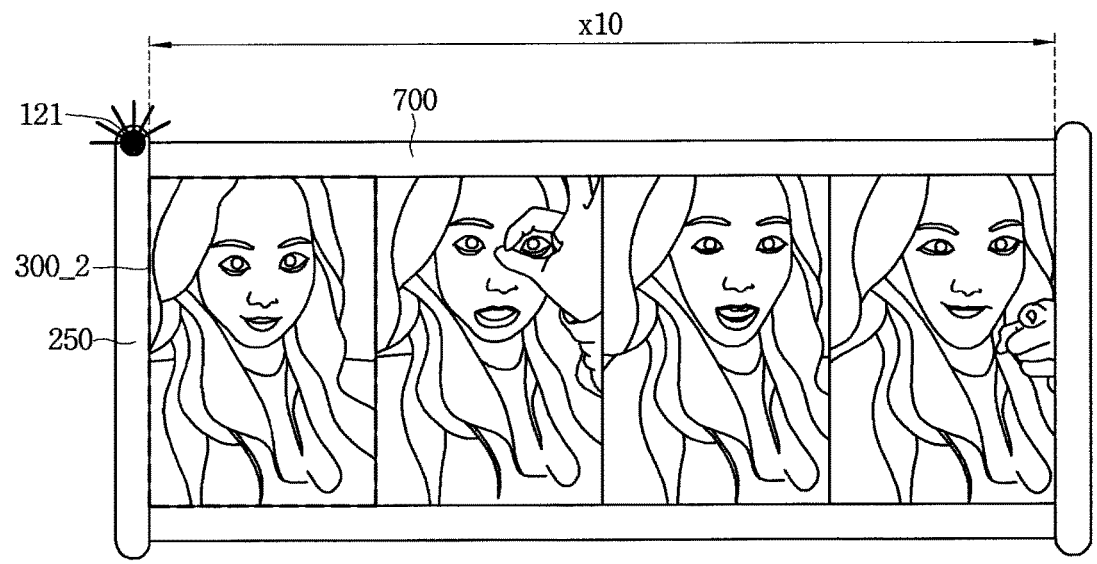

FIGS. 13A and 13B are views illustrating that the number of continuous shooting available images varies depending on the size of a preview area according to an embodiment of the present invention.

Referring to FIGS. 13A and 13B, it is shown that the display unit 250 is expanded to the maximum. The display unit 250 may be expanded by the entire expansion area 700 corresponding to the entire expansion distance x10. It is assumed that the size of the first preview area 300_1 of FIG. 13A is less than the size of the second preview area 300_2 of FIG. 13B.

Referring to FIG. 13A, six subject images are displayed in the entire expansion area 700 of the display unit 250. An area that each subject image occupies may be identical to the first preview area 300_1. Referring to FIG. 13B, four subject images are displayed in the entire expansion area 700 of the display unit 250. An area that each subject image occupies may be identical to the second preview area 300_2. Since the size of the second preview area 300_2 is greater than the size of the first preview area 300_1, the number of images that may be displayed in the entire expansion area 700 of the display unit 250 may be less than that of FIG. 13B.

A user may further view continuously captured images in one screen by setting the size of a preview area to be smaller.

Figure 14:
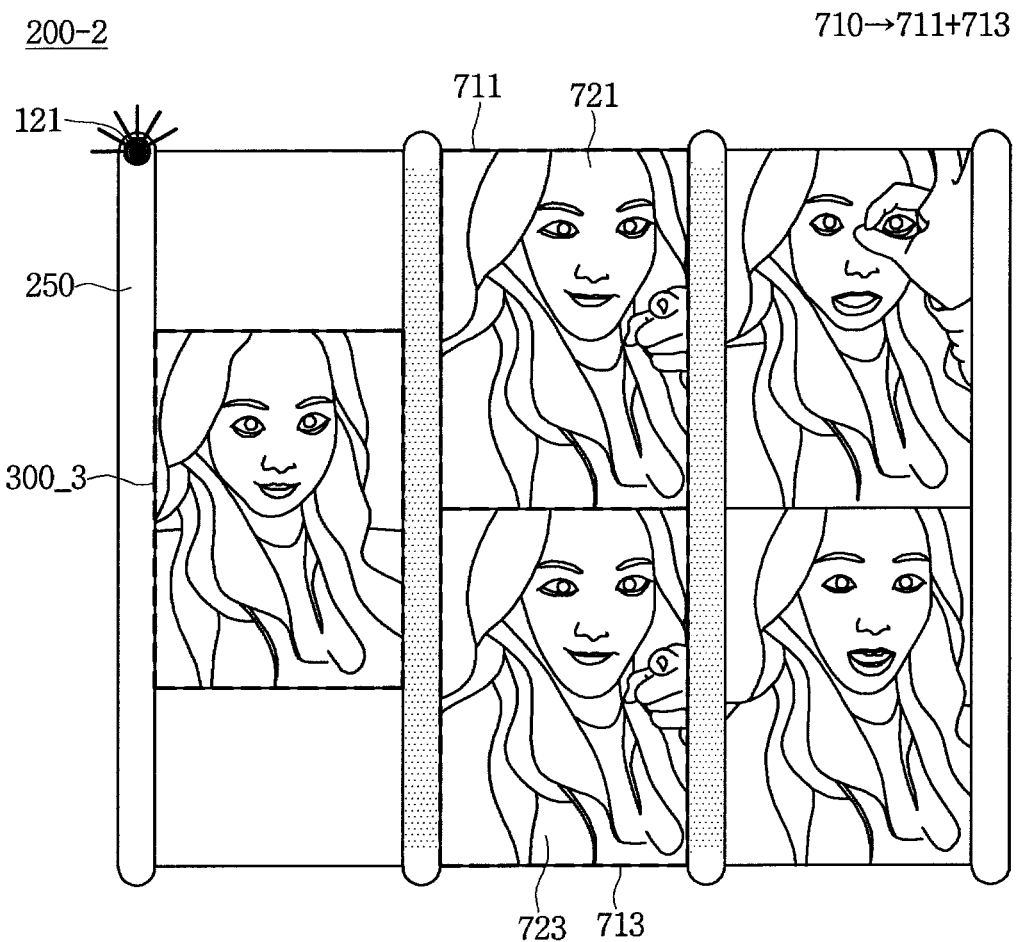
FIG. 14 is a view illustrating that the number of continuous shooting available images varies depending on the size of a preview area according to another embodiment of the present invention.

FIG. 14 is a view illustrating that the number of continuous shooting available images varies depending on the size of a preview area according to another embodiment of the present invention.

Referring to FIG. 14, it is assumed that the size of the preview area 300_3 is a settable minimum size. As the display unit 250 is expanded in the +x axis direction, the control unit 290 may perform a control on the display unit 250 to display a first image 721 in a first partial expansion area 711 and display a second image 723 in a second partial expansion area 713. That is, the expansion area 710 is divided into the first partial expansion area 711 and the second partial expansion area 713 so that a captured image may be displayed in each divided area.

Next, an embodiment in which the size of an image displayed in the expanded display unit 250 varies according to the number of captured images will be described.

Figure 15A:
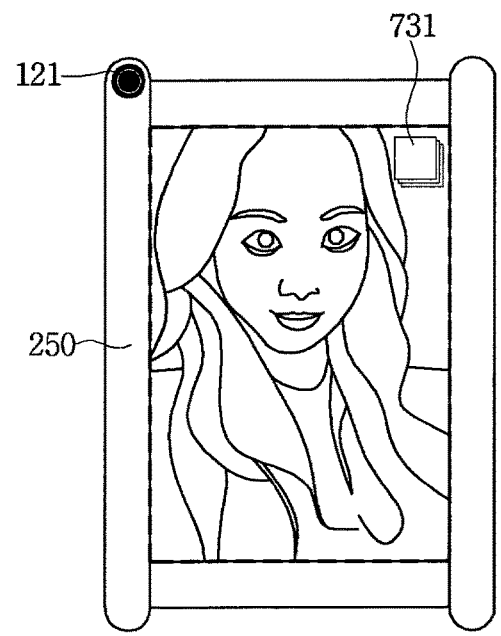
FIGS. 15A to 15C are views that the size of an image displayed on an expanded display unit varies depending on the number of captured images according to an embodiment of the present invention.
Figure 15B:
Figure 15C:
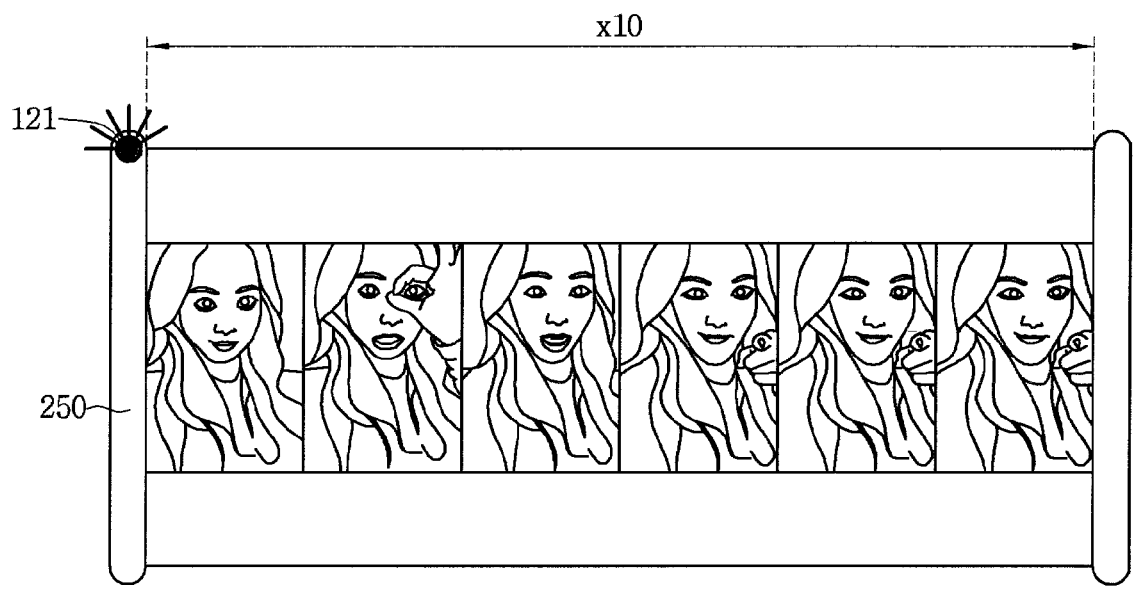

FIGS. 15A to 15C are views that the size of an image displayed on an expanded display unit varies depending on the number of captured images according to an embodiment of the present invention.

Referring to FIG. 15A, the display unit 250 is in a state of being expanded by a predetermined area and a continuous shooting icon 731 is displayed in the expanded area. When the display unit 250 is further expanded, the continuous shooting icon 731 may be an icon for displaying the continuously captured previous images of a subject during a specific time when the display unit 250 is further expanded. The continuous shooting icon 731 may be displayed in a preview area or on a captured image.

When the continuous shooting icon 731 is selected and the display unit 250 is expanded by an area corresponding to the expansion distance x10, the control unit 290, as shown in FIG. 15B, may perform a control on the display unit 250 to display four images continuously captured for 10 sec. Moreover, when the continuous shooting icon 731 is selected and the display unit 250 is expanded by an area corresponding to the expansion distance x10, the control unit 290, as shown in FIG. 15C, may perform a control on the display unit 250 to display six images continuously captured for 10 sec. Herein, the size of each image displayed on the display unit 250 of FIG. 15B may be greater than the size of each image displayed on the display unit 250 of FIG. 15C. That is, the displayed size of each image may vary according to the number of images continuously captured for a specific time.

Moreover, when there are still continuously captured images in FIGS. 15B and 15C, the control unit 290 may perform a control on the display unit 250 to allow the currently displayed images to disappear one by one and display the remaining images one by one.

Next, an embodiment in which when a force for reducing an expanded display unit is applied, continuously captured images are edited and provided is described.

Figure 16A:
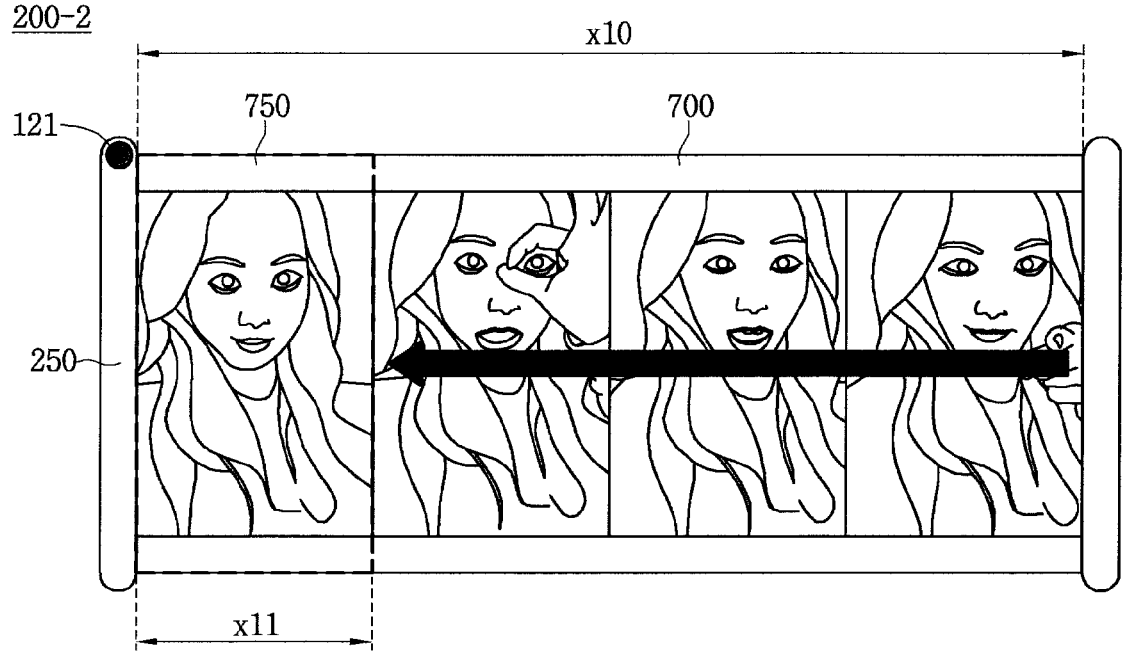
FIGS. 16A to 16B are views of editing and providing continuously captured images when a force for reducing an expanded display unit is applied according to an embodiment of the present invention.
Figure 16B:
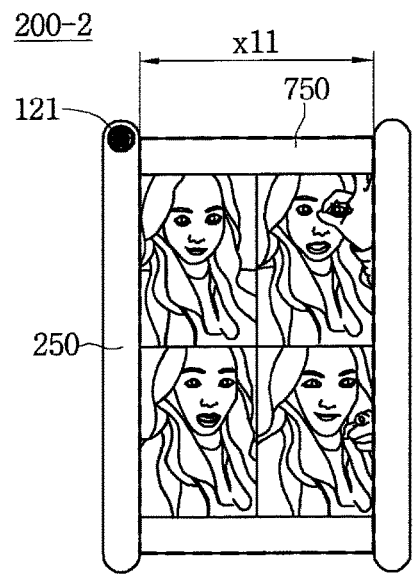

FIGS. 16A to 16B are views of editing and providing continuously captured images when a force for reducing an expanded display unit is applied according to an embodiment of the present invention.

FIGS. 16A to 16B may be a process that may be performed instead of operation S127.

Referring to FIG. 16A, the display unit 250 is in a state that the screen size is expanded by an expansion area 700 corresponding to an expansion distance x10 and the display unit 250 displays continuously captured images in the expansion area 700. Herein, the number of displayed images may be four. In this state, when a force for reducing the display unit 250 by an area 750 corresponding to an expansion distance x11 is applied, the control unit 290, as shown in FIG. 16B, may perform a control on the display unit 250 to edit displayed exiting images and display them in the reduced area 750. The size of the reduced area 750 may be a size corresponding to a preview area. Edited images obtained by adding collage effect to four images before reduction may be displayed to have a 2×2 array in the reduced area 750. The collage effect is just exemplary and images to which various effects are added may be displayed in the reduced area 750 of the display unit 250.

Figure 17A:
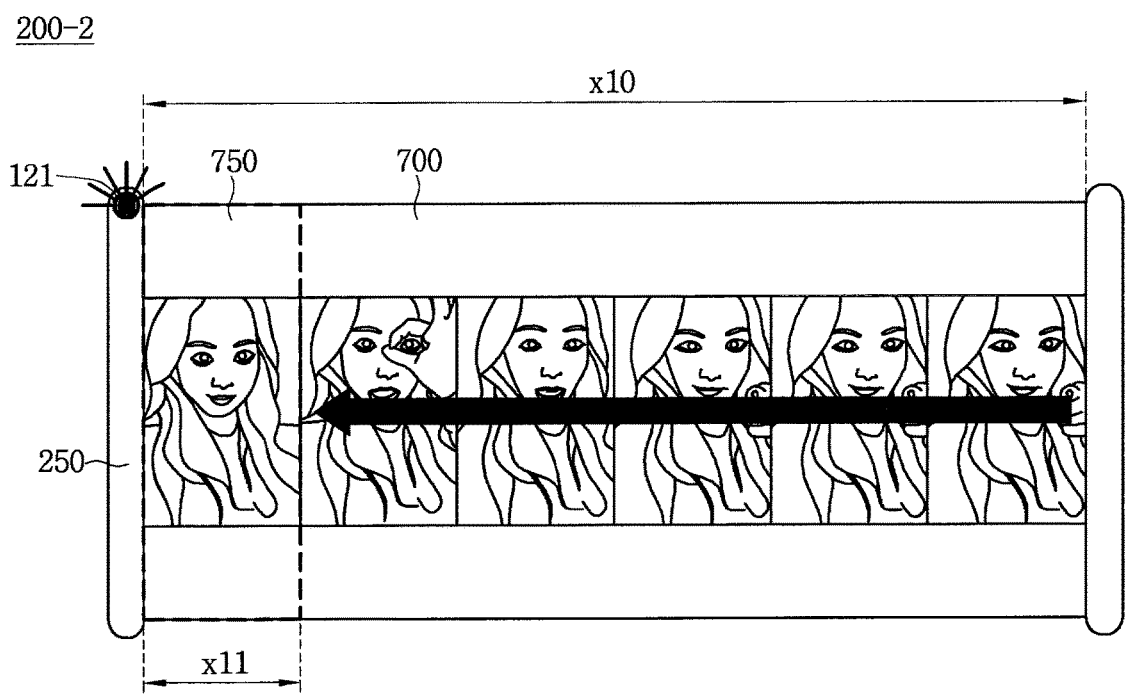
FIGS. 17A to 17C are views of editing and providing continuously captured images when an expanded display unit is reduced according to another embodiment of the present invention.
Figure 17B:
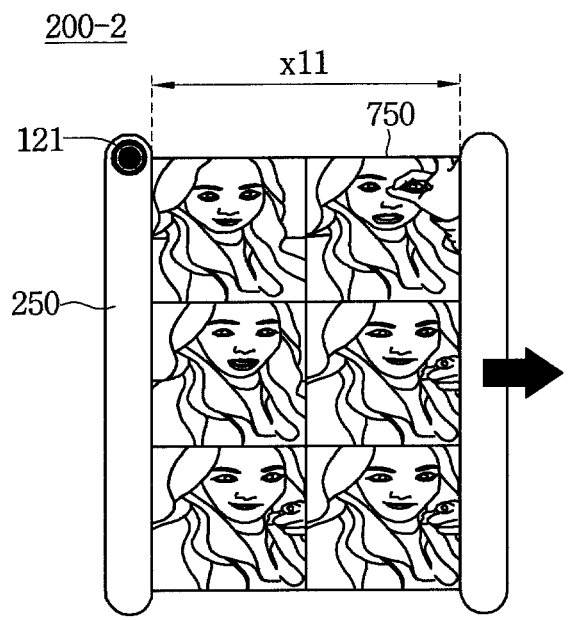
Figure 17C:
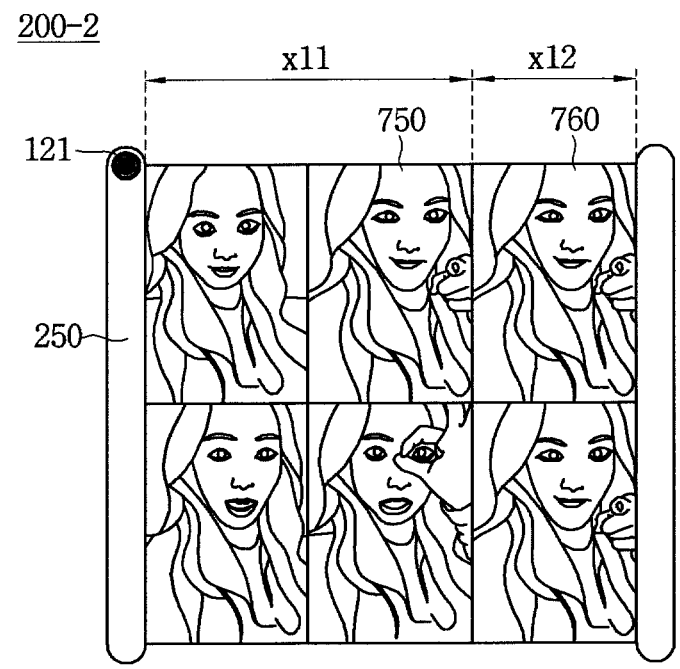

FIGS. 17A to 17C are views of editing and providing continuously captured images when an expanded display unit is reduced according to another embodiment of the present invention.

FIGS. 17A to 17C may be a process that may be performed instead of operation S127.

Referring to FIG. 17A, the display unit 250 is in a state that the screen size is expanded by an expansion area 700 corresponding to an expansion distance x10 and the display unit 250 displays continuously captured images in the expansion area 700. Herein, the number of displayed images may be six. In this state, when a force for reducing the display unit 250 by an area 750 corresponding to an expansion distance x11 is applied, the control unit 290, as shown in FIG. 17B, may perform a control on the display unit 250 to edit displayed exiting images and display them in the reduced area 750. The size of the reduced area 750 may be a size corresponding to a preview area. Edited images obtained by adding collage effect to four images before reduction may be displayed to have a 3×2 array in the reduced area 750. A user may have a need for enlarging and viewing collage effect added images in the reduced area 750. In this case, when a force for expanding the display unit 250 is applied again, the control unit 290 may display the edited images to have a 2×3 array in the existing reduced area 750 and the expanded area 760. That is, as the size of each image displayed as the screen size of the display unit 250 is expanded becomes larger, its array may be adjusted.

Then, an embodiment, in which while the display unit 250 is expanded, if there are further images to be displayed, an indicator for notifying this is displayed, is described.

Figure 18A:
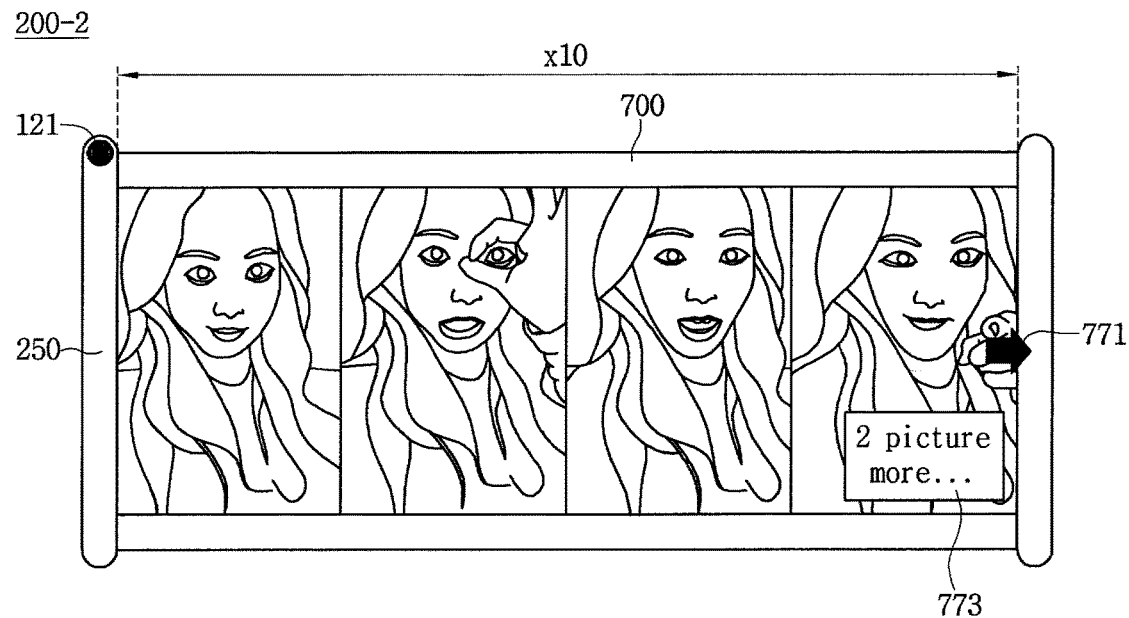
FIGS. 18A and 18B are views of displaying an indicator notifying that there are images to be displayed while a display unit is expanded according to an embodiment of the present invention.
Figure 18B:
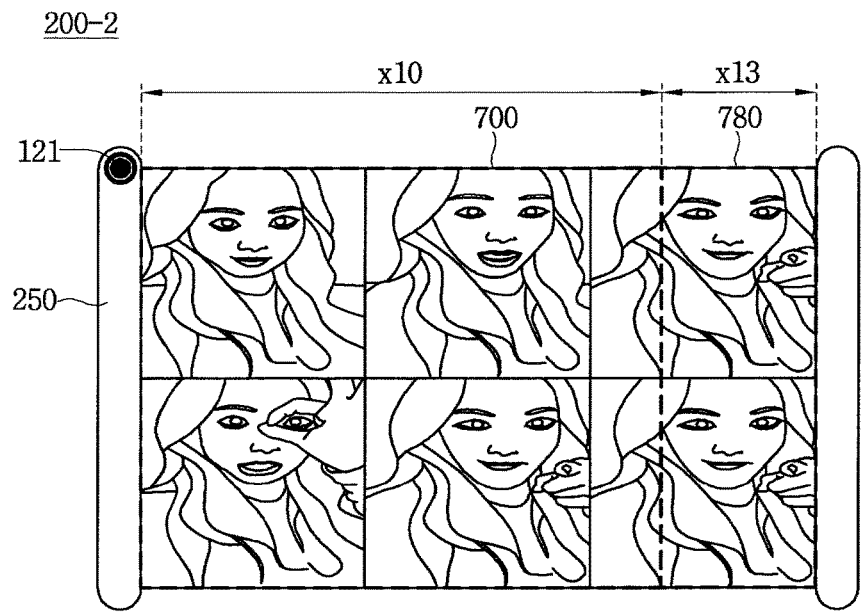

FIGS. 18A and 18B are views of displaying an indicator notifying that there are images to be displayed while a display unit is expanded according to an embodiment of the present invention.

In FIGS. 18A and 18B, it is assumed that the rollable display device 200_2 operates in a continuous shooting image display mode for displaying continuously captured images in an expansion area as the display unit 250 is expanded.

Referring to FIG. 18A, the display unit 250 is in a state that the screen size is enlarged by an expansion area 700 corresponding to an expansion distance x10. It is assumed in FIG. 18A that the display unit 250 may be further expandable. The display unit 250 may display continuously captured existing images (4 images) in the expansion area 700. The display unit 250 may display an indicator 711 notifying there are still continuously captured images and an information providing box 773 providing information to the remaining images. When a force for expanding the display unit 250 is applied, the control unit 290 may expand the screen size of the display unit 250 by an expansion area 780 corresponding to an expansion distance x13. The control unit 290 may display the continuously shooting images (for example, two images) on the expanded display unit 250 as expanding the screen size of the display unit 250. The control unit 290 may adjust the size and array of each of the existing displayed four images and the additionally further displayed two images as expanding the display unit 250.

According to an embodiment of the present invention, the size of a preview area may vary according to a user's setting. Continuous shooting may be performed in correspondence to the size of a set preview image. That is, when the size of the preview area has a first size, the size of each image that is continuously captured as the screen size of the display unit 250 is expanded may have the first size also. That is, the size of a captured image may be identical to the size of an initially set preview area.

According to another embodiment of the present invention, the number of images to be continuously captured in a preview area may be set and the control unit 290 may capture a subject in correspondence to the number of images set as the size of a screen that the display unit 250 displays is expanded. This will be described with reference to FIGS. 19A to 19C.

Figure 19A:
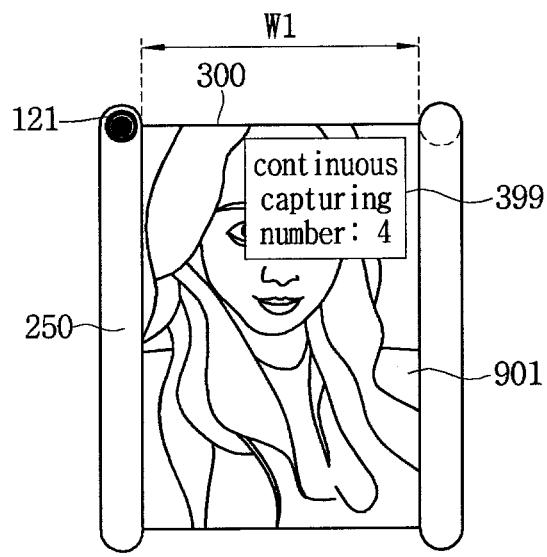
FIGS. 19A to 19C are views illustrating that the number of images to be captured continuously is set and continuous shooting is performed in correspondence to the set number according to an embodiment of the present invention.
Figure 19B:
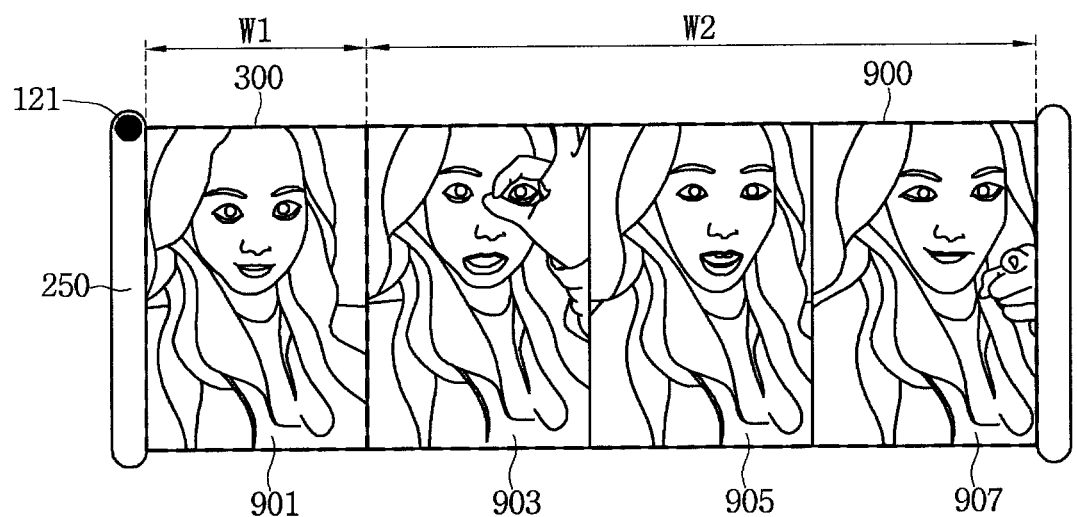
Figure 19C:
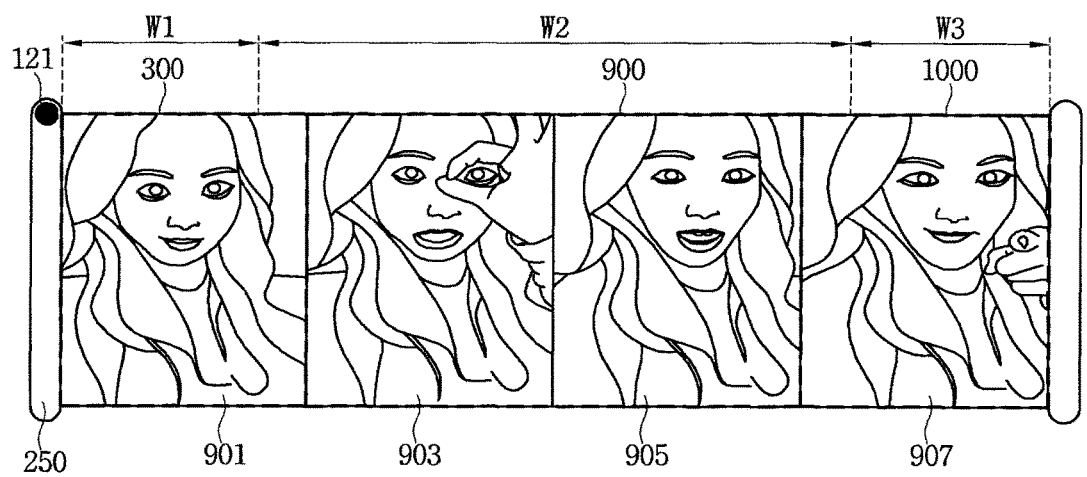

FIGS. 19A to 19C are views illustrating that the number of images to be captured continuously is set and continuous shooting is performed in correspondence to the set number according to an embodiment of the present invention.

Referring to FIG. 19A, the display unit 250 displays a preview area 300 corresponding to an expansion distance w1. A continuously capturing image number setting window 399 for setting the number of images to be continuously captured may be displayed in the preview area 300. The control unit 290 may receive a user input for setting the number of images to be captured continuously. For example, it is assumed that the number of images to be captured continuously is set to 4. If the display unit 250 is expanded in the +x axis direction, the above-mentioned continuous shooting may be performed and the control unit 290, as shown in FIG. 19B, may expand the screen of the display unit 250 by a size corresponding to the expansion distance w2. Referring to FIG. 19B, a total of four images 901, 903, 905, and 907 may be displayed in an area 900 that the screen of the display unit 250 is expanded. The width of each image may be identical to the expansion distance w1 corresponding to the preview area 300.

In a state of FIG. 19B, when the display unit is additionally expanded in the +x axis direction, the control unit 290, as shown in FIG. 19C, may control the camera 121 not to perform continuous shooting and may expand the screen of the display unit 250 by an area 1000 corresponding to a distance w3. Additionally, simultaneously, the control unit 290 may perform a control on the display unit 250 to enlarge and display the four images 901, 903, 905, and 907 in correspondence to the size of the expanded area 1000. This is because the number of images to be captured continuously is set to four.

According to various embodiments of the present invention, since a variety of information is provided according to an expansion degree in the screen size of a display unit, a user's demand may be satisfied.

Additionally, according to various embodiments of the present invention, a user may view continuously captured images in real time as continuous shooting is performed only with an operation of expanding a display unit.

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

Embodiments provide a flexible display device that is expanded or reduced only with a simple operation according to a user's request.

Embodiments also provide a flexible display device for providing a variety of information according to an expansion degree in the screen size of a display unit.

Embodiments also provide a flexible display device for continuously capturing the image of a subject as the screen size of a display unit is expanded.

In one embodiment, provided is an operating method of a flexible display device including a display. The method includes: displaying, at a preview area of the display, a preview image corresponding to an object; expanding the display in an first direction according to detecting the display is expanded in the first direction; and capturing an image of the object when the display is expanded in the first direction.

In another embodiment, a flexible display device includes: a camera to capture an image of an object while in a capturing mode; a display to expand in size or to reduce in size; a sensor to detect that the display is expanded or reduced; and a controller to: control the display to display a preview image corresponding to the object in a preview area of the display while in the capturing mode, expand the display in a first direction according to detecting the display is expanded in the first direction, and control the camera to capture the image of the object when the display is expanded in the first direction.

wherein if an expansion distance of the display is equal to or greater than a reference distance, the controller can control the display to display the captured image of the object in an expansion area of the display, the expansion area of the display corresponds to the expansion distance.

if an expansion distance of the display is less than a reference distance, the controller can control the display to display the captured image of the object in the preview area of the display and to simultaneously display image editing menus in an expansion area of the display, and the image editing menus is for editing the captured image of the object.

The control unit can detect that the display is additionally expanded in the first direction and controls the display to display the captured image of the object in an expansion area of the display, the expansion area corresponds to an expansion distance that is greater than the reference distance.

The device may further include a storage unit storing the image, wherein the controller receives a request for selecting an image displayed in the expansion area, and the controller stores the selected image in the storage according to detecting that the display is reduced in the second direction.

The control unit can control the storage device to delete an unselected image according to detecting that the display is reduced in the second direction.

The control unit can control the display to display a plurality of continuously captured images in a plurality of expansion areas.

a total number of the displayed plurality of continuously captured images varies based on a size of the preview area.

The details of one or more embodiments are set forth in the accompanying drawings and the description below. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of a flexible display device that includes a display, the method comprising:
    displaying, at a preview area of the display, a preview image corresponding to an object;

expanding the display in a first direction according to detecting that the display is expanded in the first direction; and automatically capturing the preview image of the object when a controller of the flexible display device detects that the display is expanded to a first predetermined distance in the first direction while the preview image is displayed on the display.

2. The method according to claim 1, further comprising: if an expansion distance of the display is equal to or greater than a first predetermined distance, displaying the captured image of the object in an expansion area of the display, the expansion area of the display corresponds to the expansion distance.

3. The method according to claim 1, further comprising: if an expansion distance of the display is less than a first predetermined distance, displaying the captured image of the object in the preview area of the display and simultaneously displaying image editing menus in an expansion area of the display corresponding to the expansion distance, and the image editing menus is for editing the captured image of the object.

4. The method according to claim 3, further comprising: detecting that the display is additionally expanded in the first direction;
   if the expansion distance is greater than the first predetermined distance according to detecting that the display is additionally expanded; and
   displaying the captured image of the object in an expansion area of the display, the expansion area corresponds to an expansion distance that is greater than the first predetermined distance.

5. The method according to claim 2, further comprising receiving a request to select an image displayed in the expansion area;
   detecting that the display is reduced in a second direction that is different than the first direction; and
   storing the selected image according to detecting that the display is reduced in the second direction.

6. The method according to claim 5, further comprising: deleting an unselected image according to detecting that the display is reduced in the second direction.

7. The method according to claim 2, wherein displaying the captured image of the object in the expansion area includes displaying a plurality of continuously captured images in a plurality of expansion areas.

8. The method according to claim 7, wherein a total number of the displayed plurality of continuously captured images varies based on a size of the preview area of the display.

9. A flexible display device comprising: a camera configured to capture an image of an object while in a capturing mode;
   a display configured to expand in size or to reduce in size;
   a sensor configured to detect that the display is expanded or reduced; and a controller configured to control the camera, the display and the sensor, and the controller is configured to:
   display a preview image corresponding to the object in a preview area of the display while in the capturing mode,
   expand the display in a first direction according to detecting that the display is expanded in the first direction, and
   automatically capture the preview image of the object when the controller detects that the display is expanded to a first predetermined distance in the first direction while the preview image is displayed on the display.

10. The flexible display device according to claim 9, wherein if an expansion distance of the display is equal to or greater than a first predetermined distance, the controller controls the display to display the captured image of the object in an expansion area of the display, the expansion area of the display corresponds to the expansion distance.

11. The flexible display device according to claim 9, wherein if an expansion distance of the display is less than a first predetermined distance, the controller controls the display to display the captured image of the object in the preview area of the display and to simultaneously display image editing menus in an expansion area of the display, and the image editing menus is for editing the captured image of the object.

12. The flexible display device of claim 11, wherein the controller detects that the display is additionally expanded in the first direction and controls the display to display the captured image of the object in an expansion area of the display, the expansion area corresponds to an expansion distance that is greater than the first predetermined distance.

13. The flexible display device of claim 10, further comprising a storage for storing the image,
   wherein the controller receives a request for selecting an image displayed in the expansion area, and the controller stores the selected image in the storage according to detecting that the display is reduced in the second direction.

14. The flexible display device according to claim 13, wherein the controller controls the storage device to delete an unselected image according to detecting that the display is reduced in the second direction.

15. The flexible display device according to claim 10, wherein the controller controls the display to display a plurality of continuously captured images in a plurality of expansion areas.

16. The flexible display device according to claim 15, wherein a total number of the displayed plurality of continuously captured images varies based on a size of the preview area.

* * * * *